United States Patent [19]

Baughman et al.

[11] Patent Number: 4,540,458

[45] Date of Patent: Sep. 10, 1985

[54] ADHESIVE BINDING METHOD FOR SERIATIM FED SHEETS

[75] Inventors: Richard C. Baughman, Geneseo; David S. Bump, Rochester; Charles R. Hubbard, Spencerport, all of N.Y.

[73] Assignee: Eastman Kodak Company, Rochester, N.Y.

[21] Appl. No.: 612,220

[22] Filed: May 21, 1984

Related U.S. Application Data

[62] Division of Ser. No. 380,966, May 24, 1982, Pat. No. 4,473,425.

[51] Int. Cl.[3] .................... C09J 5/00

[52] U.S. Cl. .................... 156/312; 156/60; 156/295; 270/58; 271/225; 281/21 R; 282/DIG. 2; 355/14 SH; 412/8

[58] Field of Search .................... 156/60, 558, 295, 563, 156/312, 566, 356, 578, 358, 908, 364; 428/192; 412/8, 37; 270/58; 271/225; 355/14 SH; 281/21 R; 282/DIG. 2

[56] References Cited

U.S. PATENT DOCUMENTS

| | | | |
|---|---|---|---|
| 2,245,657 | 6/1941 | Eppler, Jr. . | |
| 2,982,979 | 5/1961 | Patterson . | |
| 3,404,880 | 10/1968 | Porter, Jr. et al. . | |
| 3,669,537 | 6/1972 | Kobayashi | 271/225 |
| 3,715,258 | 2/1973 | Cunnane | 156/356 |
| 3,793,016 | 2/1974 | Eichorn . | |
| 3,908,869 | 9/1975 | Little | 141/90 |
| 4,009,071 | 2/1977 | Snellman et al. . | |
| 4,061,523 | 12/1977 | Sendor et al. . | |
| 4,076,408 | 2/1978 | Reid et al. . | |
| 4,077,831 | 3/1976 | Snellman et al. . | |
| 4,078,785 | 3/1978 | Davis | 270/58 |
| 4,116,750 | 9/1978 | Lewis et al. . | |
| 4,134,672 | 1/1979 | Burlew et al. | 270/58 |
| 4,145,241 | 3/1979 | Snellman et al. . | |
| 4,149,288 | 4/1979 | Sendor et al. . | |
| 4,158,500 | 6/1979 | DiFrancesco et al. . | |
| 4,169,674 | 10/1979 | Russel . | |
| 4,176,945 | 12/1979 | Holzhauser et al. . | |
| 4,343,673 | 8/1982 | Smith, Jr. et al. . | |

OTHER PUBLICATIONS

Smith et al., "Binding Apparatus and Method", Research Disclosure #18102, pp. 206-209, 5-1979.

Research Disclosure Items, 22733, 22734, 22735, Mar. 1983.

Article entitled Adhesive Applicators for High-Speed Machines, pp. 56-59.

Research Disclosure Item 18540, Sep., 1979.

Research Disclosure Item 20341, Mar. 1981.

*Primary Examiner*—John J. Gallagher
*Attorney, Agent, or Firm*—G. Herman Childress

[57] ABSTRACT

A set of sheets delivered seriatim from a copier/duplicator or other source are advanced along a sheet path leading from an input station to an assembly station where a booklet is formed. As a sheet is moved along the path a line of adhesive is applied to one surface of the sheet adjacent to one side edge of the sheet. In the assembly station the sheets are jogged to align the sheets of the set and then pressure is applied to the sheets over the line of adhesive. When the entire set has been bound together into a booklet, the booklet is removed from the assembly station and delivered to an output station, such as a tote tray.

17 Claims, 19 Drawing Figures

FIG. 14
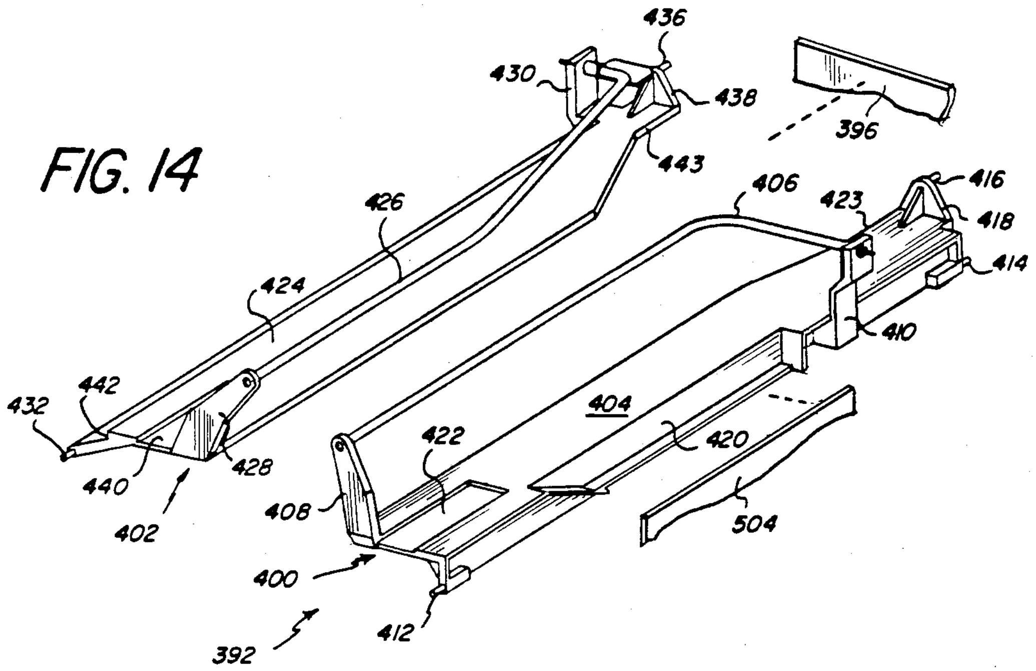
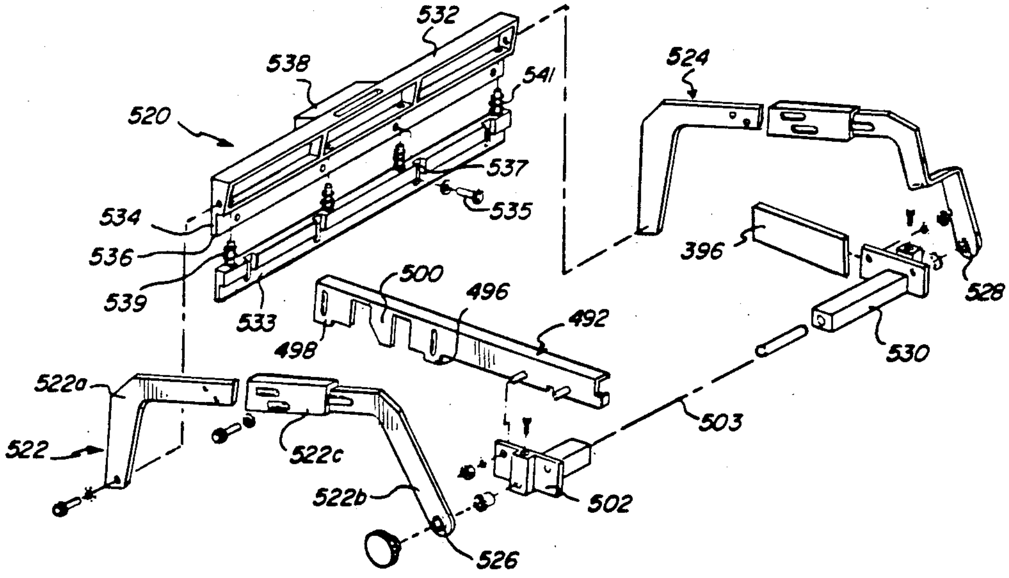
FIG. 17

ADHESIVE BINDING METHOD FOR SERIATIM FED SHEETS

This is a division of application Ser. No. 380,966, filed May 24, 1982, now U.S. Pat. No. 4,473,425.

BACKGROUND OF THE INVENTION

This invention relates to apparatus and method for binding together a plurality of sheets of a set into a booklet.

A finisher for producing stapled booklets from copies of a set if documents produced on a copier/duplicator or the like is known in the art. See, for example, commonly assigned U.S. Pat. No. 4,134,672 which issued on Jan. 16, 1979 in the name of Burlew et al entitled COPIER FINISHER FOR AN ELECTROPHOTOGRAPHIC REPRODUCING DEVICE. The Burlew et al patent discloses a recirculating document feeder which feeds a set of document sheets seriatim, beginning with the last sheet in the set, to an exposure station at a platen of a copier/duplicator or the like. The sheets are exposed at the platen and copies are produced by the copier/duplicator. The copy sheets are fed to a copier finisher which inverts the sheets and delivers them to a finishing tray. A set of sheets received by the tray are jogged to align adjacent sheets, and then one or more staples are applied to form a stapled booklet. Then the finished booklet is removed from the assembly tray and transported to a tote tray for removal by the operator.

It is also known to bind together sheets of a booklet by applying adhesive to the edge of the sheets. This is disclosed, for example, in U.S. Pat. No. 4,009,071 entitled SHEET BINDING APPARATUS which issued on Feb. 22, 1977 in the names of Snellman et al. In the Snellman et al patent sheets first are delivered to a sorter, collator or the like and jogged to align their edges. Then glue is applied to an endless belt, and the belt is moved into engagement with edges of the sheets in the compartments of the sorter, collator or the like to deposit the glue on the edges. Similar disclosures can be found in U.S. Pat. Nos. 4,077,831; 4,116,750; and 4,145,241.

U.S. Pat. No. 3,404,880 issued on Oct. 8, 1968 in the name of H. R. Porter, Jr. et al for a Gluing Attachment For a Collating Machine. The apparatus disclosed in the Porter Jr. et al patent comprises a collator having plural stations located adjacent a conveyor for holding stacks of sheets, and sheet transfer means at each station for transferring individual sheets therefrom onto the conveyor. As each sheet is lifted from the stack and placed on the conveyor a small spot of glue is applied to the sheet so that when the sheets are assembled into a booklet the glue is effective to hold the sheets together.

Most of the apparatus discussed above which secure sheets together with an adhesive apply the adhesive to side edges of sets of sheets only after they have been assembled in a collator and not while the sheets are being delivered seriatim directly from a high speed reproducing apparatus, such as a modern copier/duplicator. However, there is a definite need for an "on line" binder which can handle copies furnished at high delivery rates directly from a copier/duplicator or the like, such as disclosed for a stapler-finisher in U.S. Pat. No. 4,134,672, discussed above. The apparatus and method of the present invention fulfill such need.

SUMMARY OF THE INVENTION

In accordance with one aspect of the invention apparatus is provided for binding together a plurality of sheets. The apparatus includes an applicator for applying adhesive to sheets. Means are provided for supplying adhesive to the applicator and for effecting relative movement between a sheet and the applicator so that adhesive can be applied to the sheet during such relative movement. In addition, means are provided for stacking a plurality of the sheets having adhesive thereon so that the adhesive is between adjacent sheets.

In another aspect the invention relates to a method for binding together a plurality of sheets. The method includes the steps of moving the sheet along a path and past an adhesive applicator. Adhesive is applied to the sheet as it moves past the applicator. A plurality of sheets having adhesive thereon are stacked so that adhesive is between adjacent sheets.

BRIEF DESCRIPTION OF THE DRAWINGS

In the detailed description of the preferred embodiment of the invention presented below, reference is made to the accompanying drawings, in which:

FIG. 14 is an exploded perspective view of portions of the assembly tray;

FIG. 17 is an exploded perspective view of the pressure bar assembly;

DETAILED DESCRIPTION OF THE INVENTION GENERAL DESCRIPTION

Figure 1:
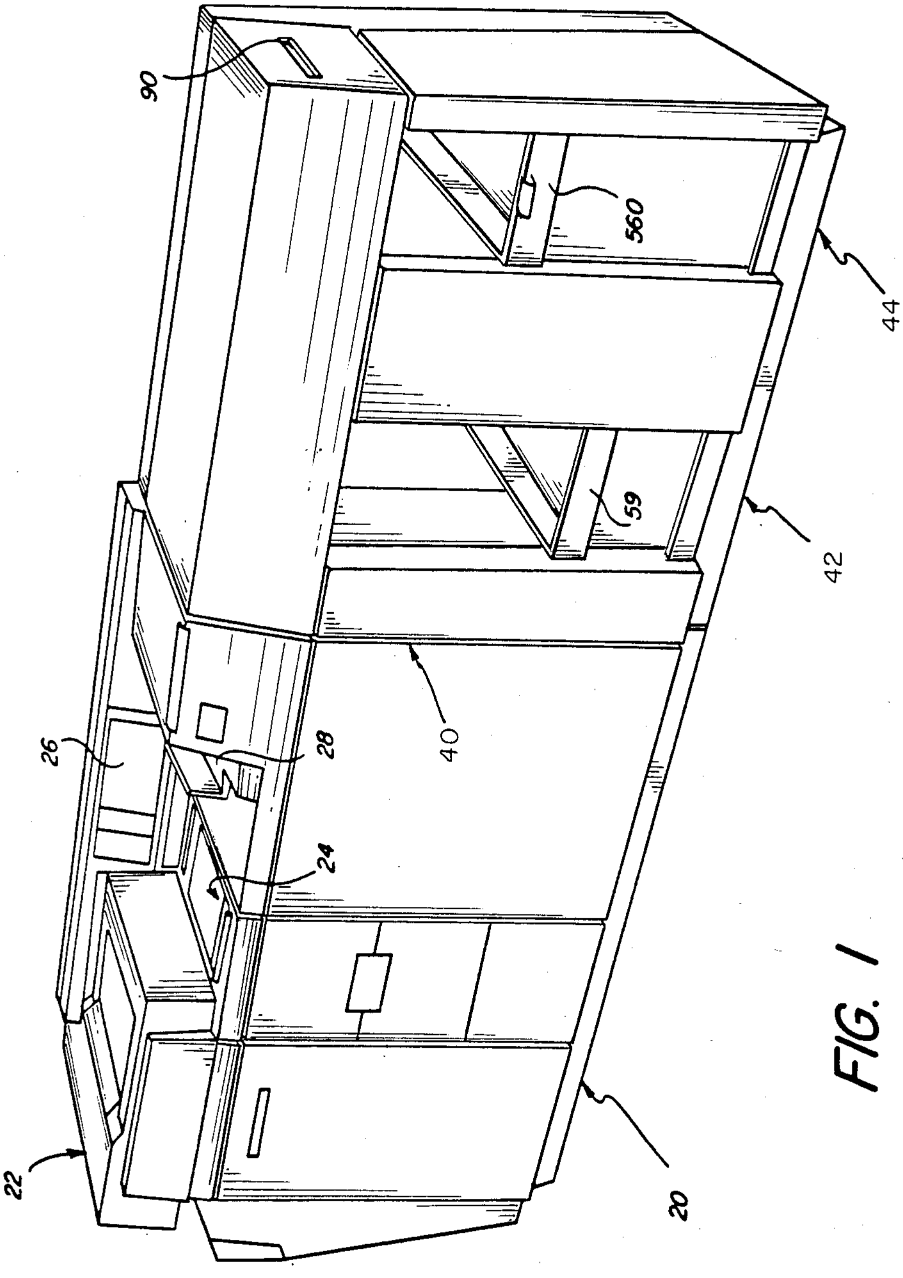
FIG. 1 is a perspective view of a copier/duplicator or the like, a stapler/finisher and binding apparatus of the present invention.

Referring now to FIG. 1 of the drawings, a copier/-duplicator or the like generally designated 20 is capable of producing a stream of copy sheets having information copied either on one side only (simplex copy sheets) or on both sides (duplex copy sheets). A recirculating document feeder 22 is shown positioned above a platen (not shown) at the imaging station of the copier 20, and the feeder is adapted to feed document sheets seriatim to the platen for copying. The recirculating feeder usually operates in a collating mode in which the document sheets are fed seriatim from a stack in a tray at the top of the feeder to the platen for copying one time for each circulation and then returned to the stack. The feeder can also operate in a noncollating mode in which one document sheet of a set is fed to the platen for copying one or more times followed by the copying of each additional document sheet. The sheets are placed in the feeder in a predetermined, page sequential order. For example, the first page is on top of the stack and the last page is at the bottom of the stack. The last (bottom) sheet is fed to the platen first and then returned to the top of the stack. In addition, document sheets can be furnished to the platen for copying through a document positioner 24, or the recirculating feeder 22 can be swung away from the platen and individual documents placed directly on the platen for copying.

The machine operator can control operation of the copier and related apparatus through an operator control panel designated 26. An area of panel 26 can be used for messages to the operator to assist in setting up the machine, clearing paper jams, etc. If copies produced by the copier/duplicator 20 are not to be stapled or bound as described later, they can be delivered into an exit tray 28 for removal by the machine operator.

Figure 2:
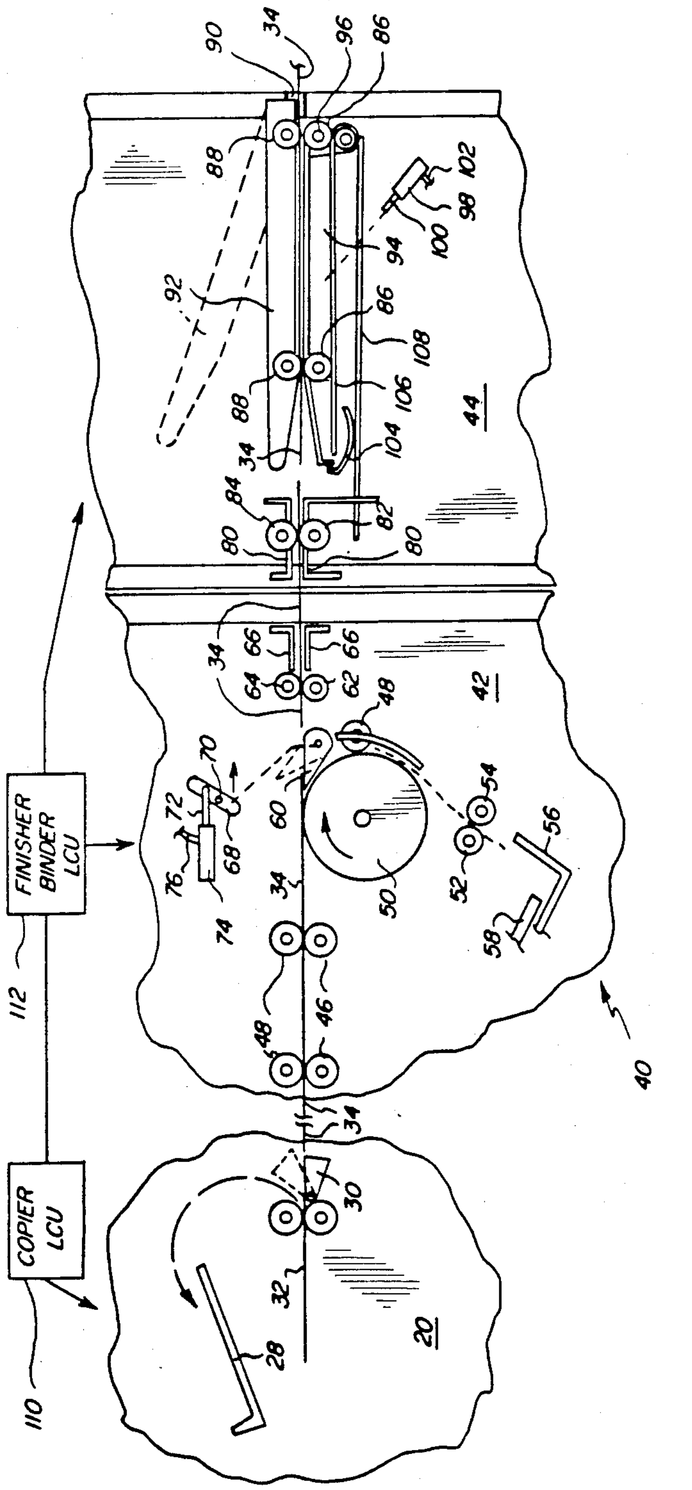
FIG. 2 is a view illustrating apparatus for controlling the flow of copy sheets from the copier/duplicator.

As illustrated in FIG. 2, copy sheets are deflected into tray 28 by locating a sheet diverter 30 in its dotted line position. The diverter then is in a position to deflect sheets to the tray from a sheet path 32. When diverter 30 is in it solid line position the copy sheets enter a sheet path 34 and are delivered to finisher/binder apparatus generally designated 40. The position of diverter 30 is set in response to entries made by the machine operator on the panel 26 of the copier/duplicator.

The finisher/binder 40 comprises a stapler finisher portion 42 and a binder portion 44. The finisher 42 receives a plurality of copy sheets, assembles them and staples the sheets together to form finished sets. The binder 44 receives a plurality of sheets, assemblies them together and secures the sheets into booklets by means of an adhesive.

The combination of a recirculating feeder, copier/duplicator and stapler finisher generally described hereinbefore is disclosed in more detail in the before-mentioned U.S. Pat. No. 4,134,672 to Burlew et al. Also, recirculating feeders for handling simplex document sheets, or simplex/duplex document sheets, or the combination of a recirculating document feeder and document positioner, as described above, are disclosed in U.S. Pat. Nos. 4,169,674, issued on Oct. 2, 1979 in the name of M. J. Russel, U.S. Pat. No. 4,076,408 issued on Feb. 28, 1978 in the names of M. G. Reid et al, U.S. Pat. No. 4,158,500 issued June 19, 1979 in the names of A. B. DiFrancesco et al, and U.S. Pat. No. 4,176,945 issued on Dec. 4, 1979 in the names of R. C. Holzhauser et al, and item No. 18540 on pages 526 and 527 of Vol. 185 of Research Disclosure (September 1979 edition), published by Industrial Opportunities Ltd., Homewell, Havant, Hampshire, P091Ef, United Kingdom. The disclosures in these patents and publication are incorporated herein by reference.

THE STAPLER/FINISHER

The finisher 42 has a plurality of sets of drive rollers 46 and idler rollers 48 that advance copy sheets along path 34. The copy sheets then can be driven around turnaround rollers 50 and driven through rollers 52 and 54 and onto an assembly tray 56. Sheets delivered to tray 56 are jogged and, if desired, can be secured together by staples from a stapler 58. Sets of copy sheets assembled in tray 56 are stacked on a tote tray 59 (FIG. 1) for removal by the operator. The finisher 42 as described hereinbefore can be the same as or essentially the same as the finisher disclosed in the previously-mentioned U.S. Pat. No. 4,134,672. Accordingly, reference is made to that patent for a more complete description of the finisher 42 and other apparatus described hereinbefore.

In order to allow copy sheets to be fed to the binder 44, the finisher of U.S. Pat. No. 4,134,672 is provided with a sheet diverter 60 which is positionable in either the solid or dotted line positions shown in FIG. 2. When the diverter is in the dotted line position sheets travelling along sheet path 34 are deflected around turnaround rollers 50 into the assembly tray 56. When diverter 60 is in the solid line position sheets continue travelling along sheet path 34 and into the nip between a set of drive rollers 62 and idler rollers 64. These rollers are effective to drive a sheet between a pair of guides 66 that form an exit slot leading from the finished 42 into the binder 44.

Diverter 60 can be moved between its two positions in response to movement of an operating lever 68 shown connected diagrammatically to the diverter. The operating lever 68 is pivoted intermediate its ends, as shown at 70, and the end portion opposite from the connection to the diverter is secured to a rod 72 of a pneumatic cylinder 74. When air or other fluid under pressure is provided to the cylinder 74 through a conduit 76, rod 72 is retracted to pivot operating lever 68 in a counterclockwise direction. Such movement is transmitted to the diverter 60 to move it from its solid line position to its dotted line position. When fluid pressure in line 76 is reduced, a return spring in cylinder 74 effects extension of the rod 72 to thereby return the diverter to its normal solid line position.

THE ADHESIVE BINDER

A sheet travelling along path 34 enters the binder 44 between a pair of spaced guide plates 80, and is thus delivered into the nip between sets of drive rollers 82 and idler rollers 84. In some instances it is desirable to feed copy sheets leaving the rollers 82, 84 directly through the binder apparatus 44 without securing the sheets together, just as sheets can be delivered through the finisher 42 without stapling sheets together. Accordingly, the binder has sets of drive rollers 86 and idler rollers 88 that can be located in the solid line position in FIG. 2 to receive a sheet from the rollers 82, 84 and deliver such a sheet through an exit slot 90 at the end of the binder opposite from the finisher 40. Thus sheet path 34 can be used to furnish sheets from the copier/duplicator 20 directly through the finisher 42 and binder 44 to a downstream location, such as a copy sheet tray, a collator, etc.

The sets of idler rollers 88 preferably are mounted on shafts carried by a frame 92. The rollers and the frame can be swung upwardly about the right end of the frame to separate the idler rollers 88 from the drive rollers 86. This feature facilitates removal of sheets if paper jams occur in the area between the drive and idler rollers 86 and 88.

Similarly, the drive rollers 86 are supported on a carriage 94 that pivots about the axis of a shaft 96 on which one set of the drive rollers 86 is mounted. Simultaneous clockwise pivotal movement of the carriage 94 and frame 92 can be effected by a pneumatic cylinder 98 having a rod 100 connected to the carriage 94, as shown diagramatically in FIG. 2. In response to introduction of fluid under pressure through a line 102, the rod 100 is extended to effect clockwise pivotal movement of carriage 94 and frame 92 about the axis of shaft 96 to move the parts to the dotted line position as illustrated in FIG. 2. When in the dotted line position, sets of sheet deflectors 104 and 106 located on the underside of carriage 94 are positioned with respect to the sheet path 34 to deflect a sheet leaving the rollers 82, 84 and urge such sheet downwardly onto a receiving tray 108.

LOGIC AND CONTROL UNITS

As well known in the art, a logic and control unit (LCU) designated 110 in FIG. 2 can be provided for controlling the copier mainframe, the recirculating feeder etc. See, for example, the beforementioned U.S. Pat. No. 4,134,672. A separate logic and control unit 112 can be provided for the finisher/binder apparatus 40. LCU 112 can monitor various functions of the finisher/binder and, in response to signals received therefrom, provide control signals to operate the apparatus. The logic and control units 110 and 112 are interconnected in any suitable manner in order to provide the required communication between the copier mainframe and the finisher/binder. For example, the required communication can be accomplished through the use of a conventional general purpose interface bus and, if required, hardwired connections. A suitable interface bus preferably is a programmable communication interface designed for interfacing the microprocessor systems comprising LCUs 110 and 112. This type of interfacing allows each microprocessor system to operate independently but be able to exchange information for use by the other microprocessors. One of the microprocessor systems, for example LCU 110, comprises the controller microprocessor while the other microprocessor, for example LCU 112, comprises the noncontrolling microprocessor. Also, while a single LCU 112 is shown for controlling both the finisher 42 and binder 44, the finisher and binder can have separate LCUs. Separate LCUs would be used when the finisher and binder are intended for independent use.

It will be observed that diverter 60 for deflecting a sheet into the finisher normally is in its lower position so that a sheet passes directly through the finisher to the binder unless a signal is received from the LCU to actuate cylinder 74 and move the diverter 60 to its dotted line position. Similarly, the sets of drive and guide rollers 86 and 88 in the binder 44 normally are in the solid line position as viewed in FIG. 2 so that a sheet will pass through the binder apparatus to the next piece of apparatus or tray, etc. unless a signal from the appropriate LCU causes cylinder 98 to be energized.

HANDLING OF SHEETS FED SERIATIM TO THE BINDER

Figure 3:
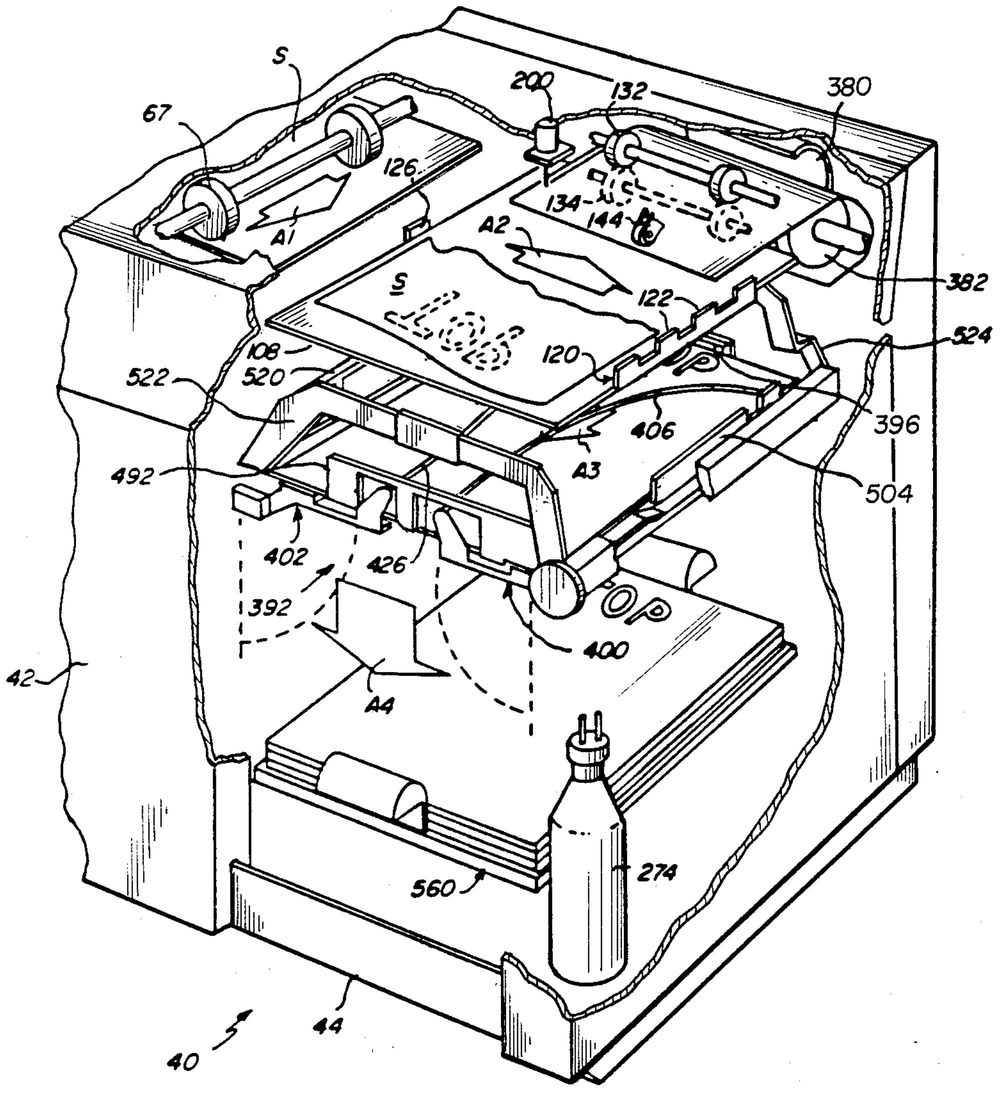
FIG. 3 is a perspective view, partially cut away and with certain parts omitted for clarity, illustrating binding apparatus of the present invention.
Figure 4:
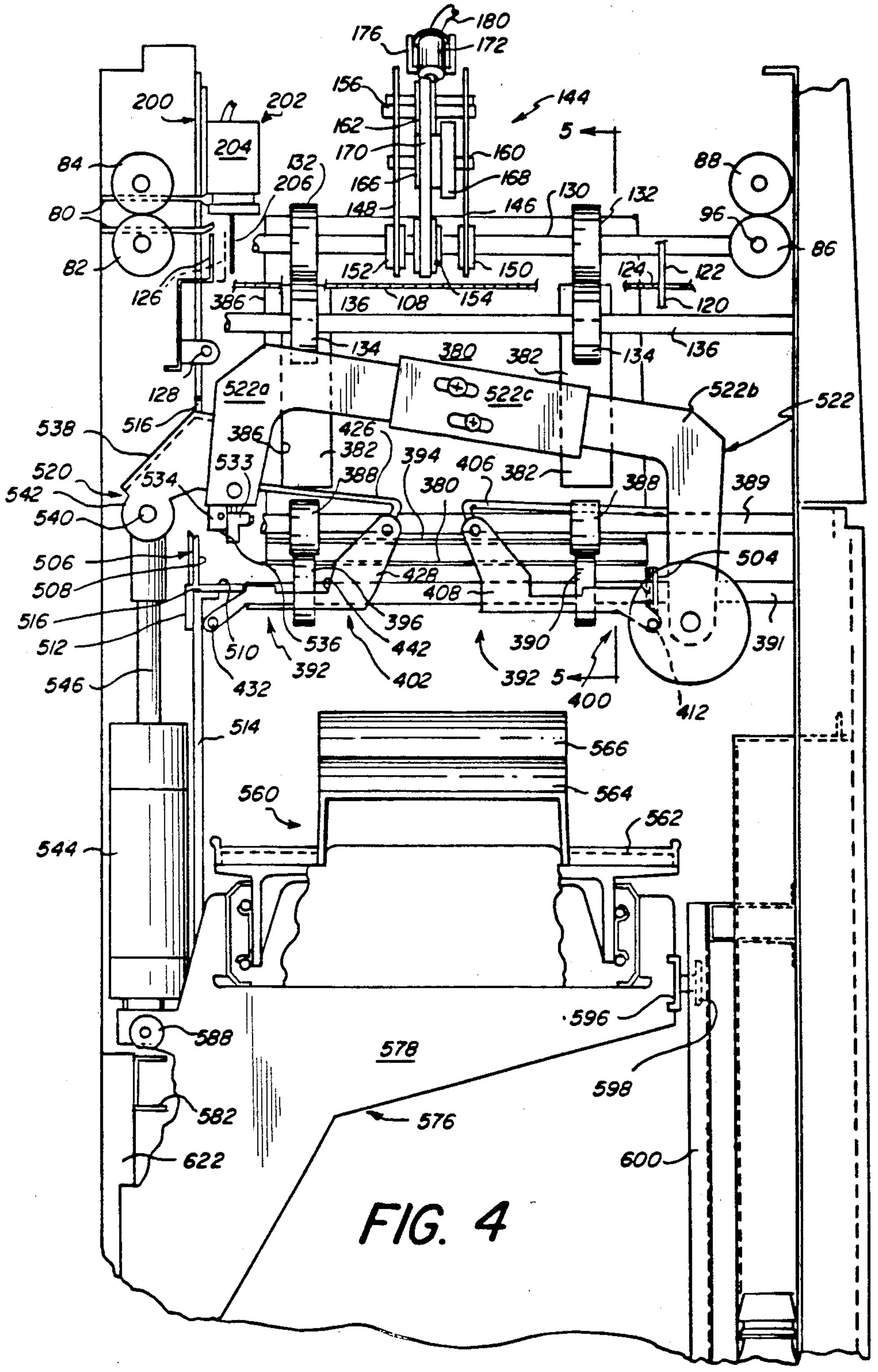
FIG. 4 is a fragmentary cross-section through the binder as viewed from near the front of the binder.
Figure 5:
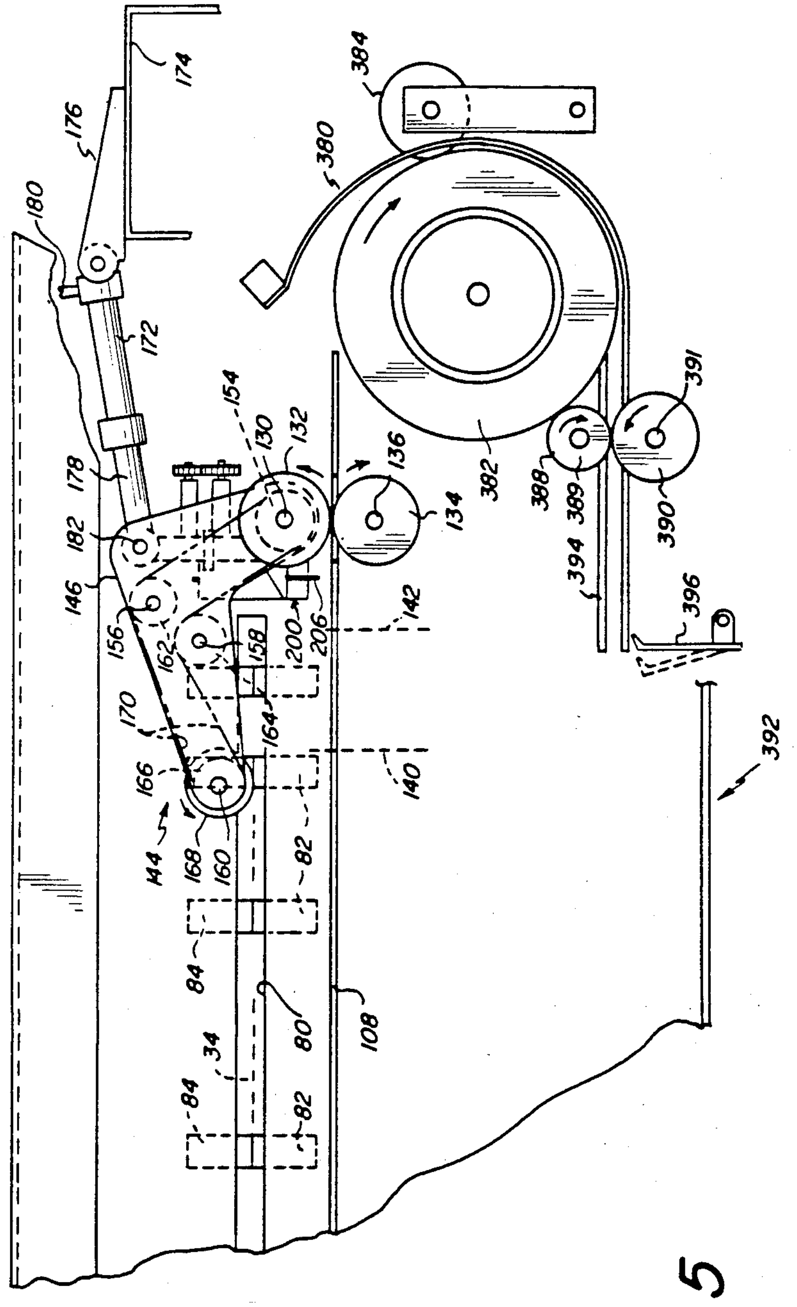
FIG. 5 is a cross-section generally along line 5—5 in FIG. 4.

When a series of sheets are to be bound together by the binding apparatus 44, the sets of rollers 86, 88 are moved to the elevated position so that a sheet travelling along the sheet path 34 and between the guide plates 80 will be deflected downwardly by the guide fingers 104, 106 and directed into the tray 108. Referring to FIGS. 3–5, gray 108 is in a plane beneath the plates 80 which guide a sheet into the binder. Rollers 82, 84 drive the sheet across the tray 108 and into engagement with a side guide 120. Guide 120 has a plurality of upwardly projecting fingers 122 which are movable in spaced slots 124 in tray 108. This permits guide 120 to be adjusted in any suitable manner in a left-to-right direction as viewed in FIG. 4 so that sheets of various widths can be handled by the binding apparatus.

At the side of the tray 108 opposite from the edge guide 120 there is a side edge jogger 126 that is pivoted at 128 for movement between the solid and dotted line positions illustrated in FIG. 4. Operation of the side jogger is effective to urge the leading edge of the sheet against the side guide 120 and to position the trailing edge of the sheet in line with the side jogger when the jogger is in its dotted line position. As explained in more detail later, this aligns the trailing edge portion of the sheet relative to an adhesive applicator. The side jogger is moved between its two positions by a solenoid, motor or other apparatus (not shown).

After a sheet is aligned on tray 108 by guide 120 and jogger 126, the sheet is driven off the tray in a rearward direction (to the right as viewed in FIG. 5) by a sheet drive mechanism. The sheet drive mechanism comprises a drive shaft 130 which supports a set of drive rollers 132. The drive rollers 132 cooperate with a set of idler rollers 134 mounted on a shaft 136. Rollers 134 project upwardly through slots in tray 108 so that the sets of rollers 132, 134 can cooperate to drive a sheet in tray 108 to the right as viewed in FIG. 5.

When sheets to be bound are delivered into the binder they are moving in a left-to-right direction as viewed in FIG. 4. In order to feed a sheet into the nips between rollers 132 and 134, it is necessary to change the direction of movement of the sheet by 90° and drive the sheet toward the rear of the machine (from left-to-right as viewed in FIGS. 5 and 6). Also, it is understood that the binder may receive sheets of various sizes with the edge of one size of sheet being nearer to the rollers 132, 134 than the corresponding edge of another size sheet. For example, in one particular embodiment of the binder, so-called letter-size sheets are fed on the tray 108 with the edge nearest the rollers 132, 134 being located in a plane designated 140 in FIG. 5. Longer sheets, for example so-called legal-size sheets, are fed to the tray with the edge nearest the rollers 132, 134 located in a plane designated 142.

Figure 6:
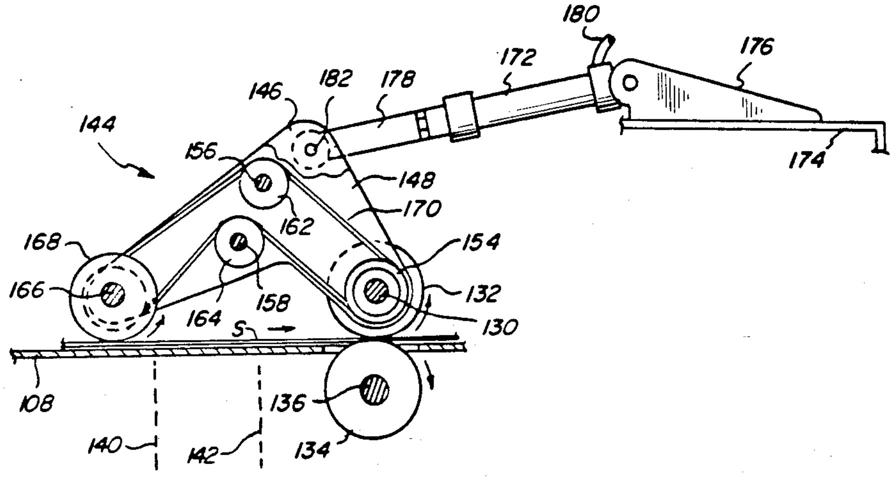
FIG. 6 is a fragmentary cross-section view showing the puck drive mechanism in a position for engaging and driving a sheet.

Referring to FIGS. 4–6, a puck drive mechanism generally designated 144 is effective to change the direction of movement of sheets received in tray 108 and to move the sheets into the nip between rollers 132, 134. Mechanism 144 comprises a pair of generally triangular-shaped plates 146, 148. The plates are located in generally parallel planes and are supported on shaft 130 by bearings 150, 152. A drive roller 154 is secured to shaft 130 between the plates 146, 148.

Plates 146, 148 support three spaced shafts 156, 158 and 160. Mounted on the shafts are three idler rollers 162, 164 and 166, respectively. A puck drive roller 168 also is secured to shaft 160. The puck roller 168 is larger in diameter than the idler roller 166 so that it projects beyond the periphery of the idler roller. The puck drive roller also is large enough to extend beyond the plates 146, 148. Roller 168 preferably is made of a resilient substance that can engage and drive a sheet without damaging the sheet. A drive belt 170 is trained around the drive roller 154 and the idler rollers 162, 164 and 166 so that when shaft 130 is rotated the drive belt 170 is effective to rotate the various idler rollers, and thus drive the shaft 160 and the puck drive roller 168.

The puck drive mechanism 144 is moved between the two positions illustrated in FIGS. 5 and 6 by a pneumatic cylinder 172 that is pivotally connected to a frame member 174 of the machine by a bracket 176. Cylinder 172 has a rod 178 that can be extended in response to an increase in fluid pressure furnished to the cylinder through a conduit 180. Rod 178 is retracted by a spring inside the cylinder 172 in response to a reduction in the fluid pressure introduced into the cylinder through conduit 180. Rod 178 is connected to the plates 146, 148 by a pin 182 that extends through the plates and through the outer end of the rod.

Normally there is little or no fluid pressure in conduit 180. Thus the return spring in cylinder 172 holds the puck drive mechanism 144 in the disengaged position illustrated in FIG. 5. In this position the mechanism in general, and puck drive roller 168 in particular, are located above the plane of the sheet path 34 leading into the binder. The portions of the mechanism beneath path 34 are to the right of planes 140, 142 so that the mechanism does not interfere with delivery of a sheet into tray 108. Thus a sheet delivered along path 34 passes beneath the puck drive roller 168 and is received on tray 108 with one edge located beneath the puck drive roller 168 and generally somewhere in the area at or between the planes 140 and 142.

When the sheet is received and aligned on tray 108, the finisher/binder logic and control unit 112 causes air under pressure to be delivered through conduit 180 to the cylinder 172. This effects extension of rod 178 and pivots the puck drive mechanism 144 from the FIG. 5 disengaged position to the FIG. 6 engaged position. As a result the puck drive roller 168 is brought into driving engagement with the upper surface of a sheet S (FIG. 6) resting on tray 108. The puck engages an area of the sheet to the left of plane 140. At this time shaft 130 is being driven in a counterclockwise direction as viewed in FIGS. 5 and 6, thus causing the puck drive roller 168 to rotate in a counterclockwise direction. When the puck drive roller touches the upper surface of the sheet, the sheet is immediately propelled to the right and fed into the nip between the rollers 132 and 134.

Promptly after the sheet reaches the rollers 132, 134, LCU 112 shuts off the supply of fluid under pressure to conduit 180, thereby permitting the spring in cylinder 172 to retract the rod 178 and return the puck drive mechanism 144 from the FIG. 6 engaged position to its FIG. 5 disengaged position so that the next sheet can be delivered along sheet path 34 into the tray 108.

As a sheet is driven across the upper tray 108 it passes beneath an adhesive applicator generally designated 200 so adhesive can be applied to the upper surface of the sheet. Applicator 200 is located above the tray 108 and near the left side of the tray as viewed in FIG. 4 so that adhesive is applied to the upper surface of the sheet and closely adjacent to the left side edge thereof. Preferably the applicator is located relative to side jogger 126 so that a line of adhesive is applied to the upper surface of the sheet approximately 0.125 inch (0.32 centimeters) from the left side edge of the sheet.

Figure 9:
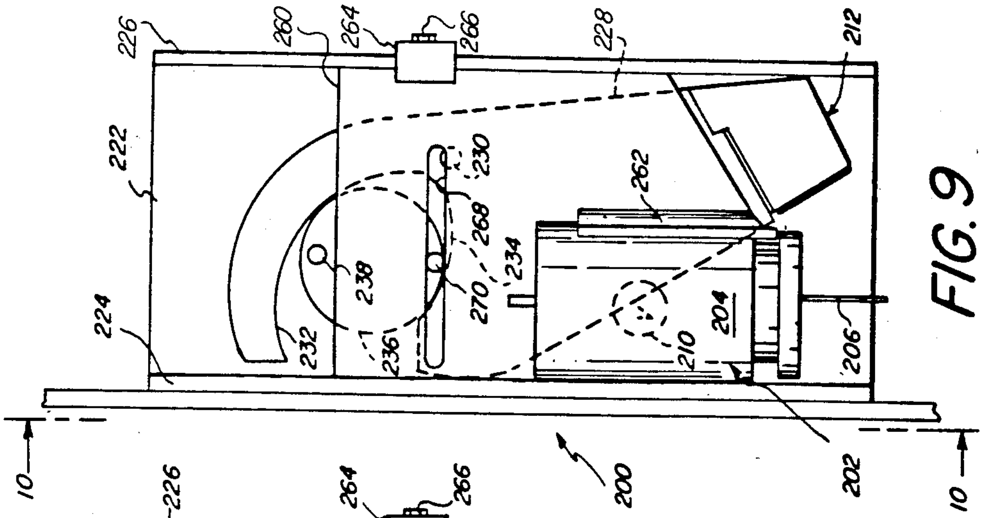
FIGS. 7, 8 and 9 are fragmentary elevation views showing three different positions of the adhesive applicator of the binding apparatus.
Figure 7:
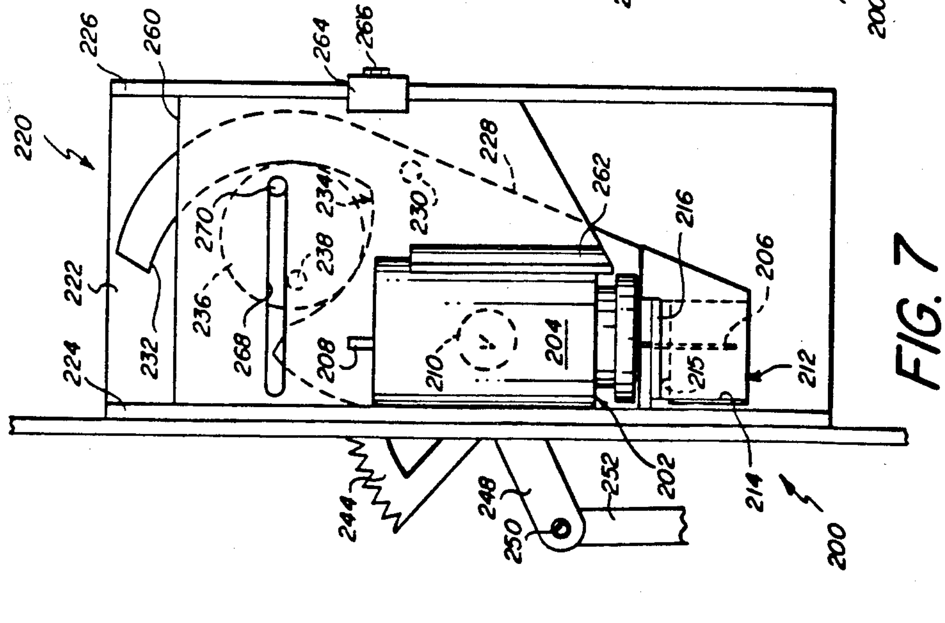
Figure 10:
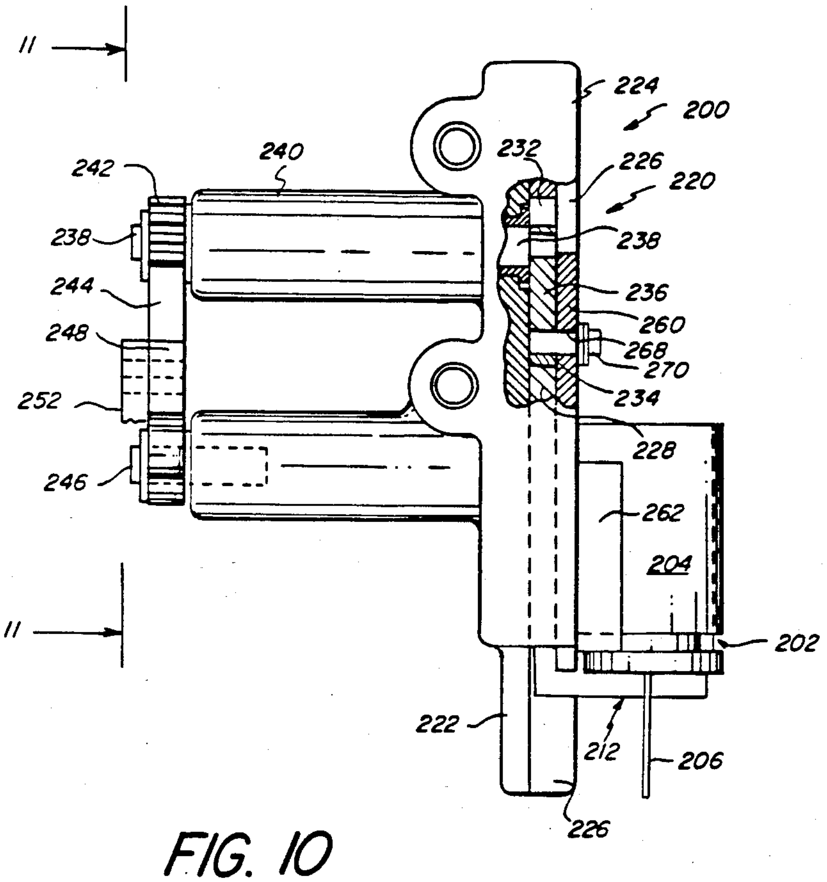
FIG. 10 is an elevation view, partly broken away, taken along line 10—10 in FIG. 9.

As best illustrated in FIGS. 7–11, adhesive applicator 200 comprises a nozzle assembly generally designated 202 that can be moved between a storage position shown in FIG. 7 and an adhesive applying position shown in FIG. 9. The nozzle assembly comprises a housing 204, a nozzle tip 206 through which adhesive is dispensed, and an inlet port 208 through which adhesive is supplied to the nozzle assembly. The nozzle assembly 202 preferably includes a solenoid operated valve 210 which is under control of the logic and control unit 112. Valve 210 controls the flow of adhesive through the applicator in response to signals from the LCU.

When the nozzle assembly is in its FIG. 7 storage position the tip 206 of the nozzle is located in a sump generally designated 212. As the nozzle assembly is moved from its storage position to its FIG. 9 operating position, the sump is swung to the side away from the path of movement of the nozzle assembly.

Sump 212 comprises a hollow container 214 having on the top thereof a seal 216 of rubber or similar elastomeric material. Preferably, container 214 is formed of a clear transparent material. The container holds a liquid solvent 215, such as water, for the adhesive material being dispensed through the nozzle. Thus when the nozzle tip end 206 is in the sump any material in the lower end of the nozzle will not dry out or clog the end of the nozzle. By making the container 214 of a transparent material a machine operator can visually determine if there is sufficient liquid in the container to cover the tip end of the nozzle. The seal 216 substantially prevents spilling and drying of the liquid in the container. Suitable detectors (not shown), such as mechanical switches or emittors—detectors, can be used to sense the presence of the applicator at its operating position or storage position and to provide a signal to the LCU 112.

A mechanism generally designated 220 is provided for moving the sump 212 between the two positions shown in FIGS. 7 and 9. Such movement of the sump occurs simultaneously with movement of the nozzle assembly 202 between its storage position (FIG. 7) and its operating position (FIG. 9). Mechanism 220 comprises a generally U-shaped guideway formed by a plate 222 and rails 224 and 226 located at side edges of the plate. The rails are generally perpendicular to the plate and secured thereto.

A cam plate 228 is pivotally mounted on plate 222 by a pivot pin 230. The sump 212 is secured to the lower end of the cam plate 228. An opening in the upper end of the cam plate is defined by two cam follower surfaces 232 and 234 which meet adjacent to the pivot 230. A circular cam 236 fits between the cam follower surfaces 232 and 234 with one face of the cam being adjacent the surface of the plate 222. A drive shaft 238 is journaled in a housing 240 projecting from the rear of plate 222. One end of the drive shaft 238 is connected to the cam 236 and the axis of the shaft 238 is offset from the center of the cam 236 so that rotation of the shaft is effective to cause eccentric movement of the cam about the axis of the shaft.

Figure 11:
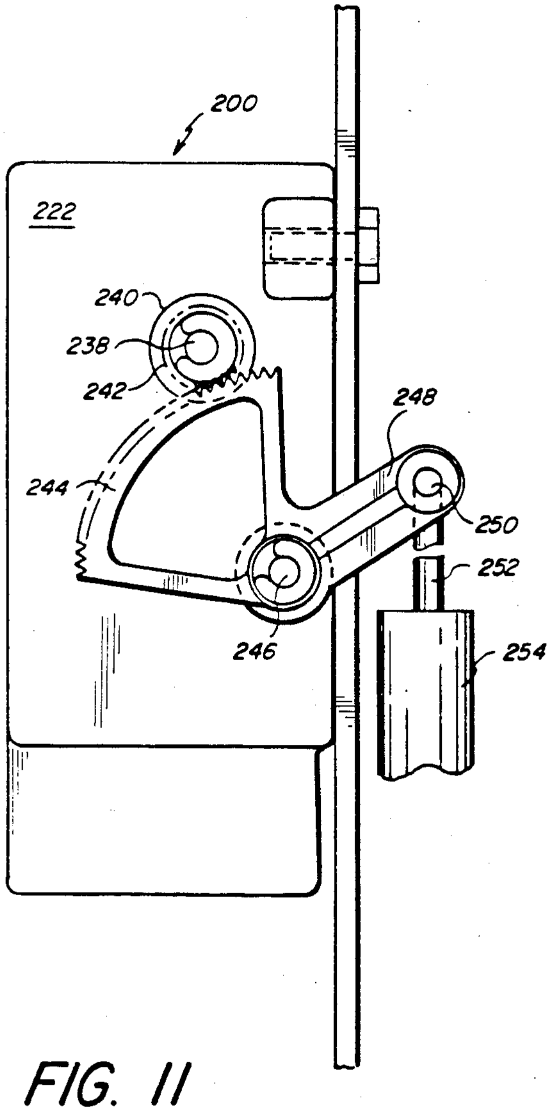
FIG. 11 is an elevation view taken along line 11—11 in FIG. 10.

The end of the shaft 238 opposite from the cam has a gear 242 mounted thereon. Gear 242 is driven from a gear sector 244 that pivots about a shaft 246. The sector has an integral arm portion 248 that is connected at 250 to a rod 252 of a pneumatic cylinder 254 (FIG. 11). Thus when the cylinder 254 is supplied with air under pressure, rod 252 is extended to effect rotation of gear sector 244 and thereby rotate the gear 242 and the drive shaft 238 to turn the cam 236. When pneumatic pressure is released, a return spring in the cylinder 254 effects movement of the parts in the opposite direction.

When cam 236 is driven in a clockwise direction from the position shown in FIG. 9, the edge of cam 236 engages the cam follower surface 232 to swing plate 228 in a clockwise direction about pivot 230, thereby to bring the plate and sump 212 to the position illustrated in FIG. 7. When cam 236 is driven in a counterclockwise direction from the position shown in FIG. 7, the edge of cam 236 engages cam follower surface 234 to drive the plate 228 in a counterclockwise direction about pivot 230, thereby moving the plate and the sump 212 to the FIG. 9 position.

A plate 260 is positioned between the side rails 224, 226 and adjacent to the surface of the cam plate 228. A nozzle mounting member 262 is secured to the surface of plate 260 opposite from the cam plate 228, and the nozzle assembly 202 is held by the mounting member 262.

The plate 260 is retained in its position between rails 224, 226 by a retainer 264 that is secured to rail 226 by a fastener 266. The retainer 264 has a flange portion that overlies part of the plate 260 to prevent it from moving away from the cam plate 228. A lip (not shown) can be provided on the outer edge of rail 224 to limit movement of plate 260 away from cam plate 228.

Plate 260 has a narrow slot 268 that extends horizontally across the upper end portion of the plate. A pin 270 is eccentrically mounted on the cam 236 and projects through slot 268 in plate 260. As the cam is rotated about the axis of shaft 238, pin 270 swings through an arcuate path about the axis of shaft 238 and also travels along slot 268, thereby effecting vertical movement of plate 260 between rails 224, 226 and in a plane generally parallel to the plate 222. Thus the applicator assembly 202 is moved first vertically upwardly from its FIG. 7 storage position to its FIG. 8 elevated position as the cam is rotated approximately 90° counterclockwise, and then the applicator assembly is moved downwardly from its FIG. 8 position to its FIG. 9 operating position as the cam rotates an additional 180° counterclockwise. Reverse movement of the cam effects movement of the applicator assembly from the FIG. 9 position upwardly to the FIG. 8 position and then back downwardly to the FIG. 7 position.

Figure 8:
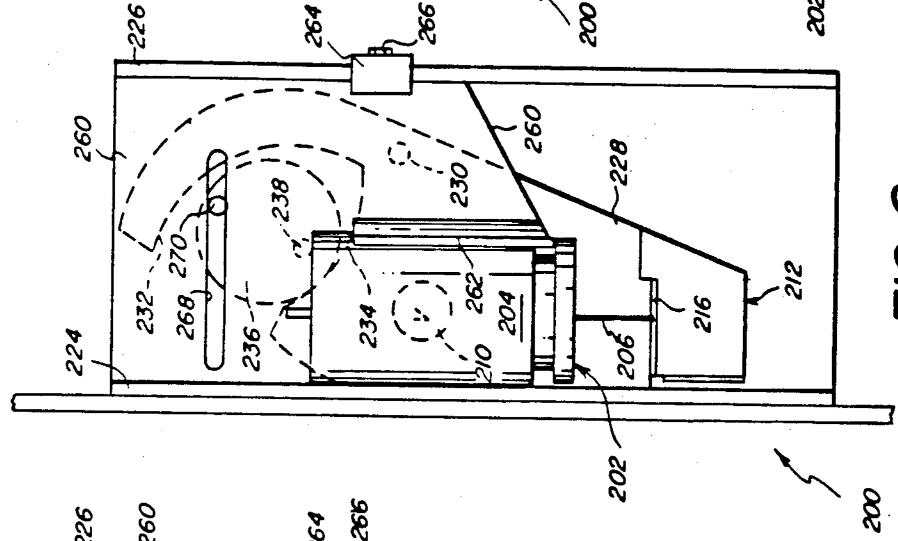

As the cam moves counterclockwise from the FIG. 7 to the FIG. 8 position, the cam moves freely within the opening defined by cam followers 232, 234 of the cam plate 228. Therefore, the plate remains in its FIG. 7 position during such movement of the cam. Further movement of the cam from its FIG. 8 position causes the cam to engage the surface of cam follower 234 and thereby swing the cam plate about pivot 230 from its FIG. 8 position to its FIG. 9 position. Such movement swings the sump 212 to the right and out of the path of movement of the applicator assembly as the assembly moves from its most elevated position illustrated in FIG. 8 to its operating position illustrated in FIG. 9.

As mentioned previously, rotation of the cam 236 is effected by a pneumatic cylinder 254 which has a spring for returning rod 252 to the cylinder when pneumatic pressure is removed. As a result, the adhesive applicator assembly 202 and the sump 212 are returned from their FIG. 9 position to their FIG. 7 position for storage in the event of a power failure which would shut off the source of the pneumatic pressure. This is desireable because it returns the end 206 of the applicator to the sump 212 so that adhesive in the end of the applicator will not dry out and clog the system.

Figure 12:
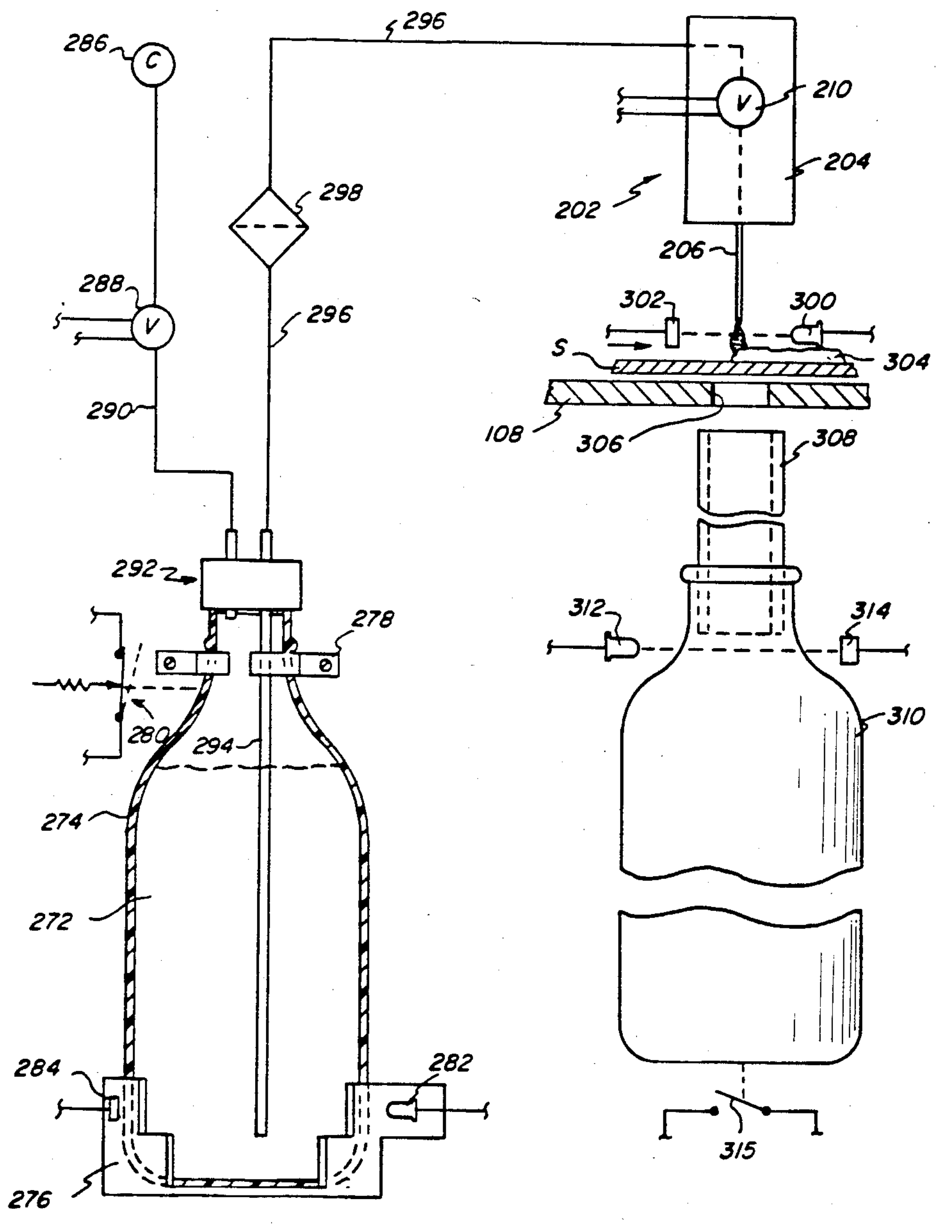
FIG. 12 is a fragmentary detailed view of the adhesive dispensing system of the binding apparatus, some elements being shown diagramatically.
Figure 13:
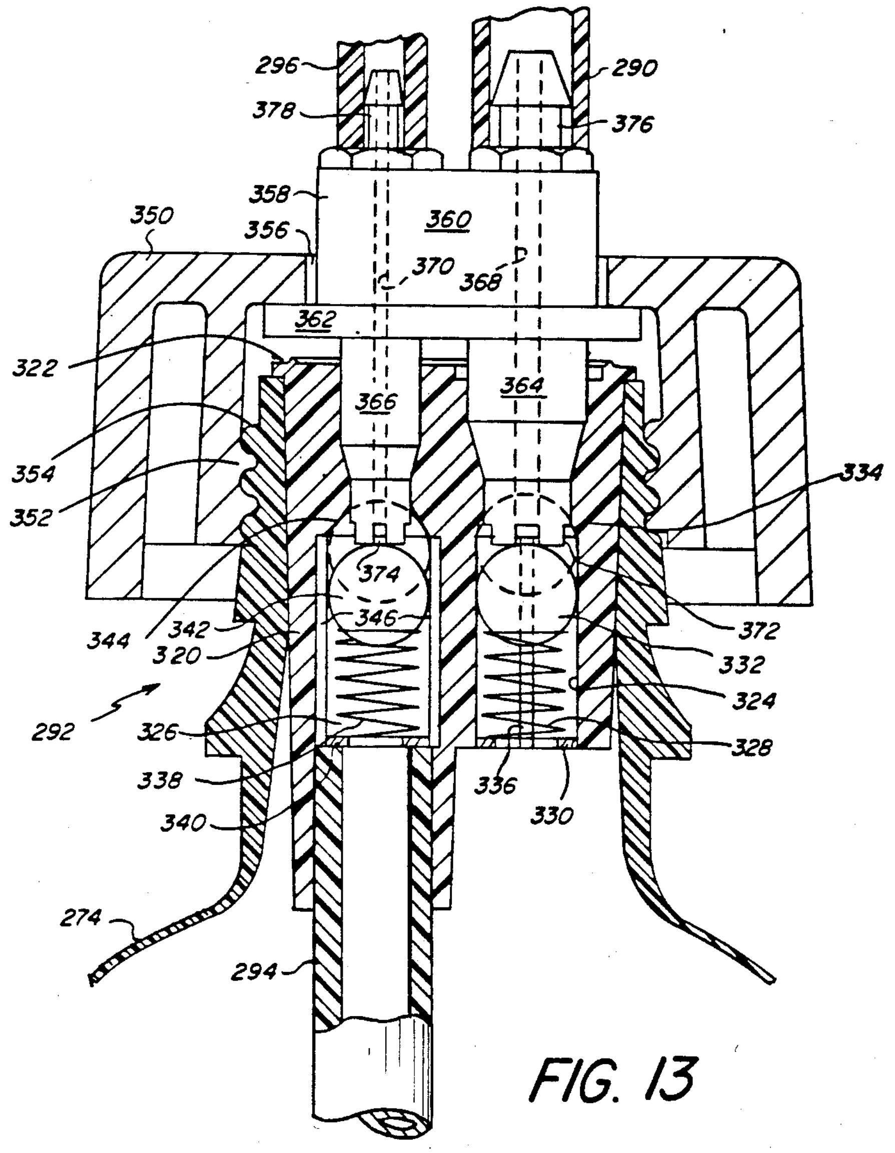
FIG. 13 is an enlarged detail view of the interface between the adhesive cartridge and other portions of the adhesive system.

Referring now to FIGS. 12 and 13, adhesive 272 for the adhesive dispensing system is provided in an adhesive cartridge 274. Cartridge 274 is a container formed of a high strength material which allows the cartridge to be pressurized for dispensing of the adhesive. The lower portion of the cartridge is seated in a cartridge holder 276 and the upper portion of the cartridge is snapped into a retainer 278. When the cartridge is placed in the retainer 278, the cartridge closes a normally-open switch 280, thereby producing a signal to the LCU indicating a cartridge is present in the retainer. Also, an emitter 282 and detector 284 in holder 276 provide a signal to the LCU indicating that the level of adhesive 272 in the cartridge is above or below the lower end of the cartridge. This signal allows the machine LCU to signal the machine operator to replace the cartridge when only a small amount of adhesive remains in the cartridge 274.

Air or other gas under pressure is introduced into the upper portion of the cartridge above the level of the adhesive 282 to pressurize the cartridge. This may be accomplished by providing air from a compressor 286 forming part of the binder apparatus. A solenoid operated control valve 288 can be provided in a line 290 leading from the compressor to the cartridge in order to control the flow of air to the cartridge. Valve 288 is operated by the binder LCU. The air under pressure is introduced into the cartridge through a cartridge closure and interface generally designated 292. This interface is illustrated in detail in FIG. 13 and will be described later. At this point it is sufficient to understand that air under pressure is introduced through the interface into the upper portion of the cartridge above the level of adhesive 272, thereby to pressurize the cartridge. This allows adhesive to be forced through a conduit 294 that extends from the lower portion of the cartridge through the interface 292 to the outside of the cartridge where it is connected to a conduit 296. The lower end of conduit 294 is below the path between the emitter detector 282, 284 so that the operator can be signaled when the adhesive level approaches the lower end of conduit 294. Conduit 296 is connected to the inlet port 208 (FIG. 7) of the applicator assembly 202. A filter 298 preferably is provided in conduit 296 to remove particles in the adhesive that may be above a predetermined size. For example, the filter may remove any particles larger than 100 microns.

The solenoid operated valve 210 in the applicator assembly 202 controls the flow of adhesive through the nozzle 206 as it is applied onto a sheet of paper designated S in FIG. 12. In this manner a small bead or line of adhesive 304 is applied to the upper surface of the sheet S. The flow of adhesive from the end 206 of the nozzle is detected by an emitter 300 and detector 302 located on opposite sides of the adhesive path from the nozzle to the sheet S. The detector provides a signal to the binder LCU indicating that adhesive is (or is not) flowing from the nozzle. The LCU tracks the stream of copy sheets through the copier and binder. If adhesive is not flowing from the applicator at any time during movement past the applicator of the second copy sheet through the last copy sheet of a set of copy sheets, the LCUs will stop the copier and binder and signal the machine operator.

During normal operation the adhesive system does not apply adhesive to the first sheet of a set of sheets fed past the applicator nozzle. However, for each subsequent sheet of the set of sheets, the adhesive flows from the end 206 of the applicator assembly during a time interval beginning just before the leading edge of a sheet reaches the end 206 and continuing until just after the trailing edge of the sheet has passed the end of the nozzle. For example, adhesive can begin flowing from the nozzle end about twenty miliseconds before a sheet reaches the nozzle end and stop about twenty miliseconds after a sheet passes beneath the nozzle end. The flow of adhesive continues without interruption while each sheet except the first sheet of a set of sheets to be bound together has passed the adhesive nozzle. Thus, an uninterrupted line of adhesive is applied to the second and subsequent sheets of the set.

From the foregoing it is apparent that there are very short periods of time during which adhesive flowing from the end 206 of the nozzle is not being applied to copy sheets. In order to avoid accumulation of adhesive in the area beneath the applicator assembly, the tray 108 immediately beneath the nozzle end 206 is provided with a large opening 306 so that adhesive not applied to a sheet of paper passes through the opening. A conduit 308 has one end portion thereof located immediately beneath the opening 306 to receive any adhesive passing therethrough. The conduit has another end portion that is connected to a collection container or bottle 310 located at a suitable remote location in the binder housing. Ultimately the bottle 310 will become filled with adhesive and need to be replaced. When the level of collected adhesive in bottle 310 reaches the upper portion of the bottle it is detected by a sensor comprising an emitter 312 and detector 314. A signal produced by the sensor and furnished to the binder LCU can be used to signal the operator of the need to change the bottle 310. Alternatively, the signal to the LCU can be produced by a weight-sensitive switch 315 that is beneath bottle 310 and is closed by the weight of adhesive in bottle 310 when the bottle is substantially full.

The various solenoid control valves, switches, emitter-detectors and the like illustrated in FIG. 12 and described hereinbefore are preferably coupled to the logic and control unit 112 for the finisher. This allows the logic and control unit to receive signals and send control signals to the various sensors, valves, etc, in order to control of the operation of the machine.

Referring now to FIG. 13, the cartridge closure and interface 292 includes a seal member 320 which fits within and closes the upper end of the neck of the cartridge 274. A lip 322 on the upper end of the seal member engages the upper edge of the cartridge to limit downward movement of the seal within the cartridge. Seal member 320 has an inlet passage 324 and an outlet passage 326, both of which extend from the top to bottom of the seal member. The lower end portion of the inlet passage 324 is generally cylindrical in shape and receives a spring 328. The spring is compressed between a spring retainer 330 at the lower end of the passage and a check valve ball 332, thereby urging the ball upwardly toward its normally closed position (shown in dotted lines) wherein the ball engages an annular seat 334 to close the passage to the flow of fluids through the passage. One or more feed grooves 336 in the wall of the passage 324 allow fluids to pass around the ball 332 when the ball is spaced from its seat (as shown in solid lines) and thereby allow the flow of fluids into or out of the cartridge. Similarly, a spring 338 in passage 326 is compressed between a spring retainer 340 and a ball 342 to urge the ball upwardly toward an annular seat 344 in the passage (as shown in dotted lines), thereby normally blocking the flow of fluids through the passage 326 into or out of the cartridge 274. Also, feed grooves 346 in the walls of the passage 326 allow fluids to pass around the ball 342 when it is moved downwardly away from its seat as illustrated in solid lines in FIG. 13.

When cartridge 274 is installed in the machine and readied for operation, a cap or cover 350 is secured to the upper end of the cartridge. This is accomplished by providing threads 352 on the cap which mate with corresponding threads 354 formed on the upper end of the cartridge. The cap has a circular opening 356 through the center of the top thereof axially aligned with the cartridge 274. A combination valve actuator and coupler 358 has a cylindrical portion 360 which passes through the opening 356 in the cap and an enlarged flange portion 362 that is larger in diameter than the opening 356. The valve actuator and coupler is positioned within the cap with flange 362 engaging the inner surface of cap 350 adjacent opening 356. The cap is then screwed onto the upper end of the cartridge in order to effect vertical movement of the actuator and coupler into the position illustrated in FIG. 13.

At the lower end of the valve actuator and coupler there are two valve actuator members 364 and 366 that fit into the upper end of the passages 324 and 326, respectively. It will be observed that the upper end of the passage 324 and the actuator 364 are somewhat larger in size than the upper end of passage 326 and the actuator 366. This assures that the valve actuator and coupler can be inserted in only one orientation into the seal member 320. As the valve actuator and coupler 358 is inserted into the seal member 320, the lower end portion of the actuators 364 and 366 engage the balls 332 and 342, respectively, to move the balls downwardly against the force exerted by springs 328 and 338. This movement unseats the balls so that fluids can pass around the balls and through the feed grooves 336 and 346. Passageways 368 and 370 extend through member 358. A series of ports 372, 374 in the lower ends of actuators 364, 366, respectively, facilitates the flow of fluids between the passageways 368, 370 and passages 324, 326.

Bosses 376 and 378 at the top of the actuator and coupler 358 are adapted to receive the ends of conduits 290 and 296, respectively. As observed from FIG. 13, boss 376 is somewhat larger than boss 378 and the conduits 290 and 296 are correspondingly sized so that the operator cannot inadvertently connect the conduits to the incorrect boss. Thus conduit 290 is connected through passageway 368 and passage 324 with the interior of cartridge 274. Similarly conduit 296 is connected through passageway 370, passage 326 and conduit 294 with the lower portion of cartridge 274.

During normal transportation and storage of the adhesive cartridge 274, a normal bottle cap (not shown) is threaded onto the upper end of the cartridge and closes off the top of the cartridge. This normal bottle cap is similar to the cap 350 except that it does not contain the opening 356. Of course, the normal cap does not include the valve actuator and coupling member 358. Therefore, the balls 332 and 342 are urged upwardly against their respective seats 334 and 344 by springs 328 and 338, respectively. These check valves together with the seal member 320 are effective to close off the upper end of the cartridge 274 and prevent loss of adhesive from the cartridge. On the other hand, the check valves are easily disengaged in response to removal of the normal cap and insertion of the member 358 and cap 350 as illustrated in FIG. 13. Also, as mentioned before, the non-uniformity in size of several parts of the apparatus insure correct mounting of the actuator member 358 and the associated conduits 290 and 296.

SHEET TRANSPORT AND INVERTER

Referring again to FIGS. 4 and 5, as a sheet is driven beneath the applicator assembly 202 and between the pairs of rollers 132, 134, it moves to the right (as viewed in FIG. 5). Ultimately it travels off the right end of the tray 108 and is delivered to a curved sheet guide 380. Guide 380 deflects the sheet initially downwardly around a pair of large soft drive rollers 382 and into the nip between rollers 382 and a pair of pressure rollers 384. The pressure rollers project through slots in the sheet guide 380. As will be observed from FIG. 4, the left side edge 386 of the sheet guide 380 is offset to the right from the nozzle end 206 of the applicator assembly. Thus as the sheet travels around the sheet guide 380 any adhesive on the sheet is spaced from the sheet guide. This avoids smearing of the adhesive onto the sheet guide, which would adversely affect movement of the sheets around the guide, and also allows the adhesive to remain at the desired position on the sheet for securing adjacent sheets together, as explained later.

After a sheet reaches the bottom of the drive rollers 382, it travels along a horizontal portion of the sheet guide 380 and between pairs of rollers 388, 390. Rollers 388 are idler rollers and are mounted on a shaft 389. Rollers 390 are drive rollers and are mounted on a drive shaft 391. These pairs of rollers drive the sheet off of the sheet guide 380 and into an assembly tray generally designated 392. A guide plate 394 located immediately above the lower end of sheet guide 380 helps guide the sheets and prevents the sheets from lifting up off of the guide 380.

THE ASSEMBLY TRAY

Assembly tray 392 is located below the plane of the lower end of sheet gate 380 so that a plurality of sheets delivered to the assembly tray can be received one on top of the other to form a stack of sheets. A rear jogger 396 located at the right end of the tray 392 (as viewed in FIG. 5) is effective to engage the trailing end of a sheet as it enters the tray 392 and urge the sheet towards the left.

Figure 15:
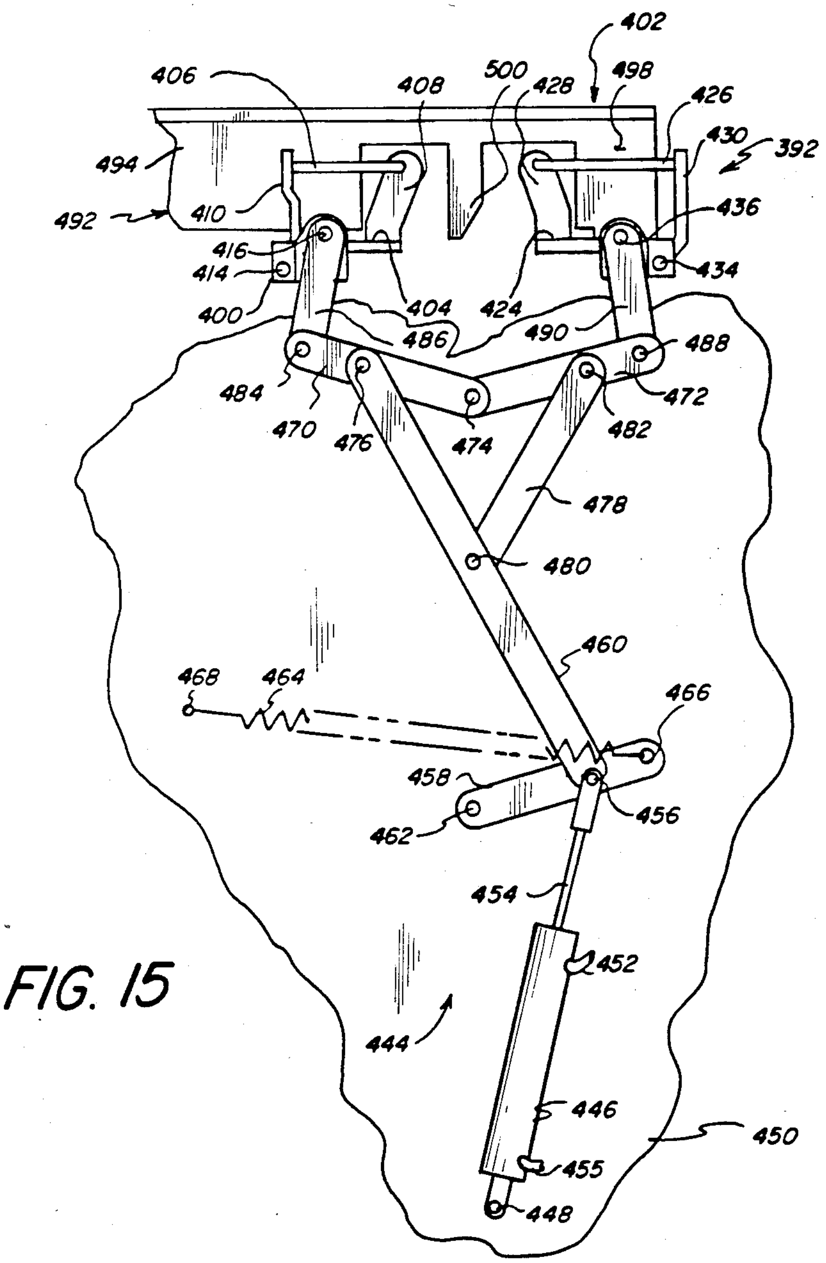
FIGS. 15 and 16 are elevation views illustrating two positions of a preferred mechanism for moving the assembly tray of the binding apparatus.
Figure 16:
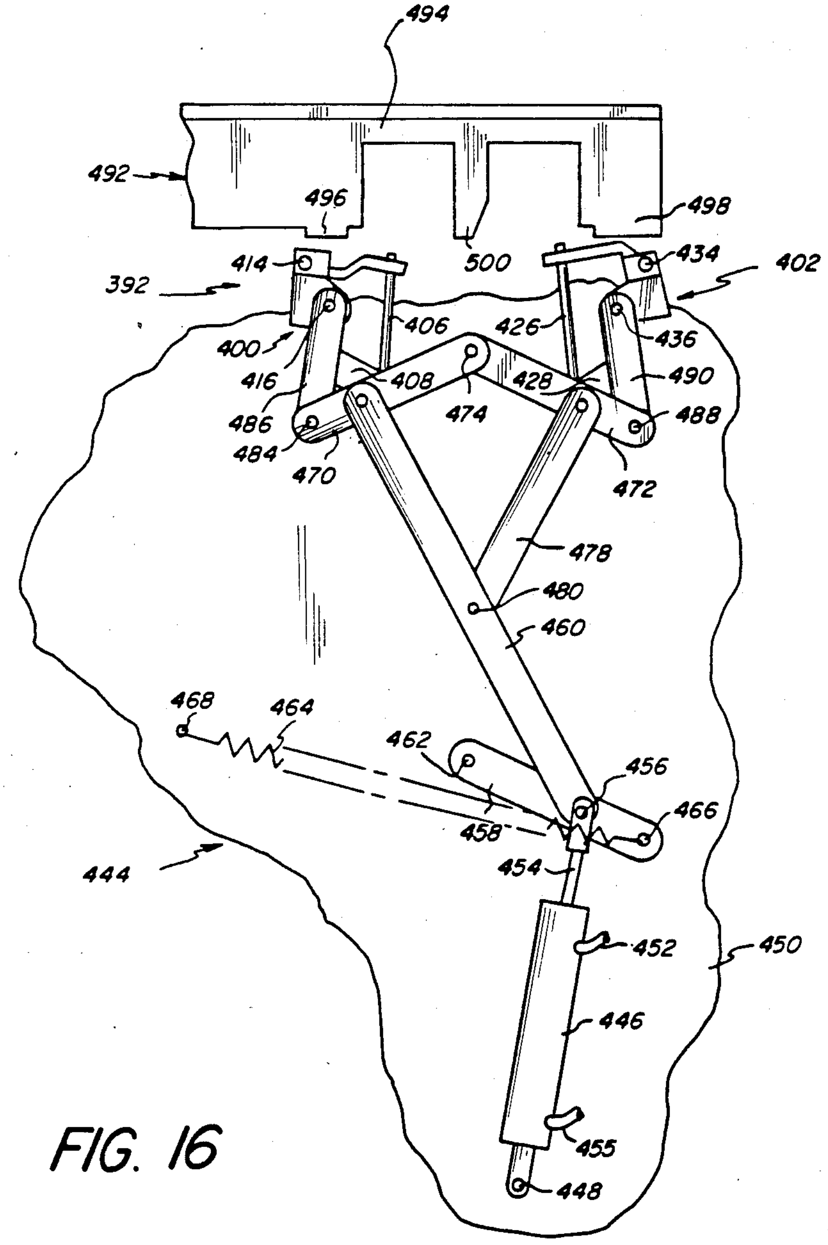

Referring now to FIGS. 14, 15 and 16, assembly tray 392 comprises a first tray portion 400 and a second tray portion 402. Tray portion 400 has a generally flat upper surface 404 and a generally L-shaped rod 406 that is supported above the surface 404 by a pair of supports 408 and 410. Rod 406 is generally parallel to surface 404 and it is located above the plane at which sheets are delivered to the tray 392 from the sheet guides 380, 394. Surface 404, on the other hand, is beneath the guides 380, 394 so that a sheet is received between the surface 404 and the rod 406.

A pair of pivots 412 and 414 at the ends of the outer side edge of the tray portion 400 are located beneath the plane of the surface 404. These pivots mount the tray portion for swinging movement between a generally horizontal position, as shown in FIGS. 14 and 15, and a generally vertical position as shown in FIG. 16. Tray portion 400 is swung between its two positions by force applied to a pin 416 located above the plane of surface 404 and beneath the sheet guide 380. A bracket 418 supporting the pin 416 is located beneath the sheet guide 380 and rearwardly of the front end of that guide so that it does not interfere with movement of sheets onto the tray 392. Pin 416 also is offset from the axis of the pivots 412, 414 and is nearer to the center of the tray than the pivots.

The tray portion 400 has a recess 420 in the outer side edge thereof which lies beneath the surface 404. Recess 420 is adapted to receive a side jogger for sheets in tray 392 as explained later. Another recess 422 in surface 404 is located at the front end of the tray portion opposite from the entrance end of the tray. Recess 422 is adapted to receive a finger of a sheet registration member against which the sheets are registered as explained later.

Tray portion 402 is similar to the tray portion 400 previously described. More specifically, tray portion 402 comprises a generally flat upper surface 424 and a rod 426 that is located above the surface 424 and supported by a pair of supports 428 and 430. Tray portion 402 is supported for movement about the axis of pivots 432 (FIG. 14) and 434 (FIGS. 15 and 16) at the outer side edge of portion 402. A pin 436 is supported above surface 424 by bracket 438. A force applied to pin 436 is effective to move the tray portion 402 from the generally horizontal position shown in FIGS. 14 and 15 to a vertical position shown in FIG. 16. A recess 440 in the upper surface of tray portion 402 is adapted to receive a finger of a sheet guide or registration member as explained later. Also, the tray portion 402 has a stepped outer edge 442 for a purpose described later.

Tray portions 400 and 402 are moved between their raised and lowered positions by a mechanism generally designated 444 and best illustrated in FIGS. 15 and 16. The mechanism 444 conprises a pneumatic cylinder 446 that is pivoted at 448 to a plate or frame member 450. When air or other fluid under pressure is introduced through a conduit 452 into the cylinder 446, a rod 454 is moved from its extended position (FIG. 15) to its retracted position (FIG. 16). The rod can be extended by introducting fluid under pressure tray conduit 455 into the cylinder.

The outermost end of rod 454 is connected at 456 to an intermediate portion of a lever 458 and to the lower end of a connecting link 460. One end of lever 458 is pivotally connected at 462 to the frame 450. A spring 464 is connected at 466 and 468 to the other end of lever 458 and to the frame 450, respectively. Spring 464 is located relative to pin 462 so that the spring applys forces to lever 458 urging the lever in a counterclockwise direction (FIG. 15) and in a clockwise direction (FIG. 16). Thus spring 464 is an "over-center" spring that is effective to urge (and hold) lever 458 (and the other movable levers, links etc. in FIGS. 15, 16) in each of the two illustrated positions. This is desireable in case fluid leaks from cylinder 446 or in case the source of fluid to cylinder 446 is interrupted by a power failure, for example. Of course, cylinder 446 can swing lever 458 in a clockwise or counterclockwise direction about pivot 462 against the force exerted by spring 464.

A pair of links 470, 472 each have one end mounted on a pivot 474 that is fixed to the frame 450 so that the links can swing about the pivot. The upper end of the link 460 is connected at 476 to an intermediate portion of the link 470. A connecting link 478 has its ends pivotally connected at 480 and 482 to the intermediate portion of the link 460 and link 472, respectively. Thus when link 460 is pulled downwardly in response to fluid entering cylinder 446 through conduit 452, links 460 and 478 are pulled downwardly to thereby swing the links 470, 472 about the pivot 474.

The outermost end of link 470 is connected at 484 to the lower end of a link 486. The upper end of link 486 is connected to the pin 416 on tray portion 400. Similarly, the outer end of link 472 is connected at 488 to the lower end of a link 490, and the upper end of link 490 is connected to the pivot 436 of the tray portion 402.

In operation, tray portions 400 and 402 normally are located so that the surfaces 404 and 424 are in a substantially horizontal plane with the central portions thereof being spaced slightly from each other as illustrated in FIGS. 14 and 15. Sheets delivered to the assembly tray 392 pass beneath the rods 406 and 426 and above surfaces 404, 424 and thus are delivered onto the tray 392. When a booklet has been fully assembled as explained in more detail later, fluid is introduced into cylinder 446 through conduit 452 to cause rod 454 to retract, thereby swinging the lever 458 about the pivot 462 from the FIG. 15 position to the FIG. 16 position. As this occurs link 460 is pulled downwardly, thereby pulling link 478 downwardly. Downward movement of links 460, 478 effects swinging movement of links 470, 472 about pivot 474 so that the outermost ends of the links are thus swung downwardly. This movement of links 470, 472 pulls links 486, 490 downwardly to thereby swing the tray portions 400, 402 about pivots 412, 414, 432 and 434 to bring the tray portions of the FIG. 16 position where surfaces 404, 424 are generally in a vertical position. When the tray portions swing down a booklet in the tray is dropped through the tray between the tray portions 400, 402.

After the tray portions have swung downwardly to allow a booklet to drop therebetween, fluid under pressure is introduced into cylinder 446 through conduit 455 to extend the rod 454. Extension of the rod is effective to swing link 458 about pivot 462 to quickly return the link from the FIG. 16 position to the FIG. 15 position. This movement of link 458 also causes movement of the links 460, 470, 472, 478, 486 and 490 from their respective FIG. 16 positions to their respective FIG. 15 positions, thereby returning the tray portions to the normal horizontal position so that additional sheets can be received for formation of another bound booklet. Spring 464 is effective to hold the ports in either the FIG. 15 position or the FIG. 16 position until the cylinder 446 is again actuated.

SHEET REGISTRATION IN THE ASSEMBLY TRAY

The rear edge jogger 396 for the assembly tray fits within cutouts or recesses 423 and 443 of the two tray portions 400, 402, respectively. Jogger 396 is effective to engage the rear edge of a sheet delivered to the assembly tray and urge the sheet toward a registration member generally designated 492 at the other end portion of tray 392. The registration member, best illustrated in FIGS. 15–17, has a vertically disposed face 494 against which sheets are driven by the jogger 396. A projection 496 on the lower edge of the registration member extends into the recess 422 in the tray portion 400. A similar projection 498 extends into the recess 440 in the tray portion 402. A third projection 500 fits into the space between the rods 406, 426 and surfaces 404, 424 of the two tray portions, as illustrated in FIG. 15. The entire sheet registration member 492 is positioned over the tray 392 and adjacent to the rod supports 408, 428 of the tray portions near the front of the binder. The spaces between the projections 496, 500 and 498 accommodate the rods 406, 426 as the rods are moved between their raised and lowered positions.

As shown in FIG. 17, registration member 492 is secured to a mounting block 502 which, in turn, is supported by the frame of the machine in any suitable manner (not shown). Block 502 is adjustable along an axis 503. Similarly, end jogger 396 is supported by a block 530 that is adjustable along axis 503. Thus the spacing between the registration member and the rear jogger is adjustable to accommodate sheets of different length in the tray 392.

A side edge jogger 504 is positioned along the right edge of the assembly tray (as viewed in FIGS. 4 and 14) and is movable between the solid and dotted line positions in FIG. 4 in any suitable manner. The recess 420 of tray portion 400 partially receives the side edge jogger 504. The jogger is adjustable in a left to right direction as viewed in FIG. 4 to accommodate sheets of various widths.

Jogger 504 is effective to urge sheets in the assembly tray against a registration member 506 (FIG. 4). A vertically disposed surface 508 of the registration member faces jogger 504 and the side edge of sheets are registered against surface 508. A horizontal flange portion 510 of the registration member projects toward the tray 392 and fits closely against the stepped outer edge 442 of tray portion 402 when the tray is in its raised position. The registration member has a flange portion 512 that is positioned along the outer surface of a plate 514 forming part of the binder frame. Flange 512 is secured to the plate 514 to hold the registration member in position. The registration member projects through an opening 516 in plate 514. When a sheet is jogged against surface 508, the portion of the sheet having adhesive thereon is located above the flange portion 510 of the registration member and the adhesive faces downwardly on the sheet. Since the first sheet delivered to the tray does not have any adhesive thereon, the flange member 510 does not become contaminated with adhesive.

THE PRESSURE BAR ASSEMBLY

Figure 18:
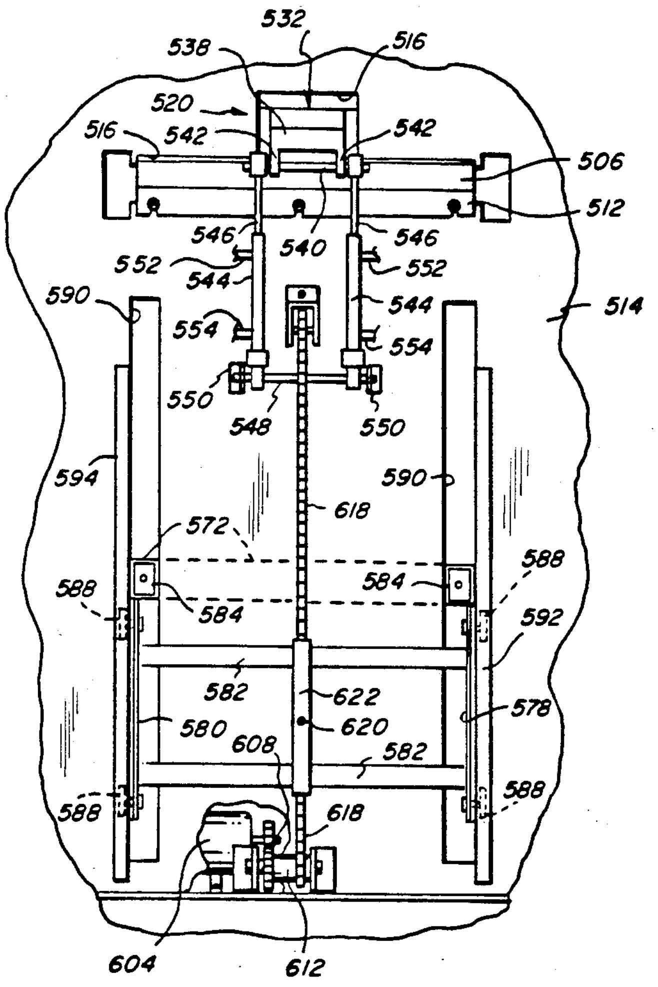
FIG. 18 is a fragmentary view from the left side of the binding apparatus.

During formation of a booklet in the assembly tray 392, sheets are pressed together in the area containing the line of adhesive in order to facilitate bonding of adjacent sheets together. In some instances, e.g., when each booklet contains only a few sheets, the pressing step can be effected only once per booklet (i.e., after all sheets are assembled in the tray.) However, for large booklets it is desireable to apply pressure to a stack of sheets after each few sheets (e.g. two-to-four sheets) have been aligned in the tray, and then again apply presssure to the stack of sheets after the last sheet of the booklet has been furnished to the tray. The apparatus illustrated in the drawings for repeatedly applying pressure to a stack of sheets is shown in FIGS. 4, 17 and 18 and comprises a pressure bar assembly generally designated 520. Assembly 520 comprises a pair of spaced arms 522, 524 of generally inverted u-shaped configuration. Arm 522 has two end portions 522*a* and 522*b* which are joined together by a coupling member 522*c*. A pin and slot type connection between the coupling member and the arm portions 522*a* and 522*b* allows the end portions of the arm to be adjusted relative to each other. Arm 524 is constructed in a similar manner. Arm 522 is pivotally connected at 526 to the mounting member 502. Similarly, arm 524 is connected at 528 to mounting member 530. The arms pivot about axis 503.

The pressure bar assembly includes a head member 532 that extends between and is secured to the ends of the arms 522, 524 opposite from their pivotal connections to their respective mounting members. A pressure bar 534 extends along the lower portion of the head 532, and the lower edge 536 of the bar is adapted to engage the upper surface of sheets in the assembly tray in the area directly above the line of adhesive on the bottom surface of the sheets. Fabrication of arms 522, 524 in pieces with an adjustable coupling securing them together allows the position of head 532 and thus the bar 534, to be adjusted in order to align the bar edge 536 with the area of the sheet above the adhesive line. As will be apparent from FIG. 4, edge 536 of the bar 534 is movable toward and away from the portion 510 of the sheet registration member when the pressure bar assembly is pivoted about the mountings 526, 528 of the arms.

The part of the bar contacting the sheets may become contaminated with adhesive. Therefore, the portion of the bar comprising edge 536 can be made as a separate piece and removably secured to bar 534 by, for example, a tongue-and-groove connection. This will allow removal and cleaning of the part that contacts the sheets in case the part becomes contaminated with adhesive.

If adhesive is present on edge 536 or the top of a sheet contacted by the edge, there will be a tendency for the sheet to lift up with the bar as the bar is separated from the sheets in tray 392. In order to avoid this tendency, a sheet holder 533 is slidably mounted on head 532 adjacent to bar 534 and to the side bar 532. As best illustrated in FIG. 17, this mounting is effected by bolts 535 that fit through vertically-elongated slots 537 in the holder and then into head 532. Guide pins 539 on top of the holder slide in openings in the head, and the holder is biased downwardly by springs 541 located around the pins.

When the pressure bar assembly moves down to press sheets together, holder 533 engages the sheets first and stops. Holder 533 contacts the sheets in an area offset from the line of adhesive so the holder ordinarily does not become contaminated with adhesive. Bar 534 then moves downwardly relative to holder 533 until the bar engages the sheets above the adhesive and presses the sheets together. During upward movement of the assembly, holder 533 remains in contact with the upper sheet as bar 534 initially moves upwardly, thereby insuring separation of the bar from the sheets. Then the holder is lifted from the sheets and moves with the bar to its fully raised position.

Referring now to FIGS. 4 and 18, head 532 of the pressure bar assembly has a nose portion 538 that projects through the opening 516 in plate 514. A pin 540 extends through a pair of projecting ears 542 on portion 538 of the head member. The pressure bar assembly is moved by a pair of pneumatic cylinders 544 having rods 546 that are connected to opposite ends of the pin 540 so that extension and retraction of the rods is effective to move the head 532. The end portions of cylinders 544 opposite from the rods 546 are connected to a pivot 548 that is mounted on plate 514 by a pair of brackets 550. Pneumatic lines 552 can provide fluid under pressure to the upper end of the cylinders 544 to retract the rods 546, thereby moving the head 532 and the pressure bar 534 downwardly. Pneumatic pressure introduced through lines 554 into the cylinders 544 is effective to extend the rods 546, thereby to raise the head 532 and the pressure bar. Fluid is supplied through lines 552, 554 from valves that are controlled by the logic and control unit 112.

During operation, sheets provided to the assembly tray 392 are engaged by the end jogger 396 and the side jogger 504 so that the sheets are urged against the registration members 492 and 506. After two-to-four sheets (for example) have been received in the tray and jogged to align the sheets, cylinders 544 are energized by fluid introduced through lines 552 to thereby pull downwardly on the pressure bar assembly. Downward movement of the assembly brings the bar 534 into engagement with the upper surface of the top sheet directly above the line of adhesive on the sheets. This pressure forces the sheets into firm contact with each other and facilitates a good bond between adjacent sheets. Then pressure in lines 552 is reduced and fluid under pressure is introduced into the cylinders 544 through lines 554, thereby lifting the pressure bar assembly so that additional sheets can be fed into the assembly tray and registered. This procedure is repeated after each few sheets are delivered to the assembly tray. The pressure step occurs during the time interval between delivery of one sheet and the next sheet to the assembly tray.

After the last sheet of a set or booklet has been received in the assembly tray, cylinders 544 are again energized to cycle the pressure bar 536 again to complete formation of the booklet. Pressure can be applied for a longer period of time after the last sheet of a booklet is in the assembly tray. When formation of the booklet is completed, cylinder 446 is energized through conduit 452 to swing the tray portions 400, 402 about their respective axes into their FIG. 16 position. The completed booklet then drops downwardly through the assembly tray under the influence of gravity. Rods 406, 426 engage the booklet as the tray portions swing to the FIG. 16 position to urge the booklet downwardly forcibly. Cylinder 446 is energized through conduit 455 to return the assembly tray portions to their normal horizontal position as shown in FIG. 15 so that another booklet can be formed.

THE TOTE TRAY AND CARRIAGE

Figure 19:
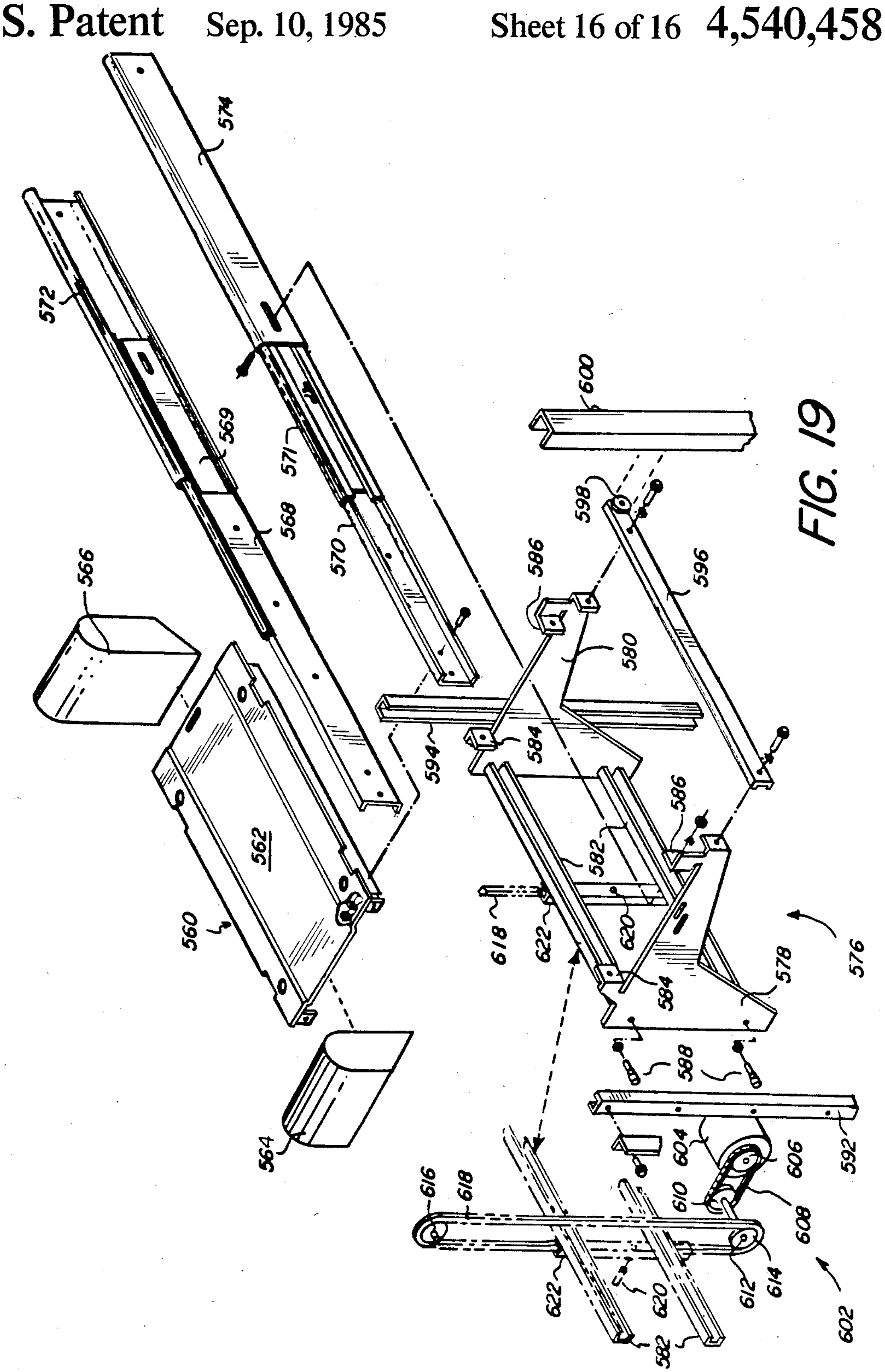
FIG. 19 is an exploded perspective view of a tote tray, carriage for the tray, and apparatus for moving the carriage and tote tray.

Referring now to FIGS. 4, 18 and 19, when a completed booklet is delivered from the assembly tray it is received into a tote tray 560 located immediately beneath the assembly tray. Tote tray 560 comprises a generally flat tray surface 562 on which booklets are received, and handles 564, 566 at the outer and inner ends, respectively of the tray. The handles 564, 566 can be used by the machine operator for first pulling the tray out of the machine and then carrying the tray and a stack of completed booklets thereon to a suitable workstation for unloading the booklets.

The side edges of tray 560 are secured to a pair of guide rails 568, 570. Guide rails 568, 570 are telescopically and removably received in intermediate guide rails 569, 571 which, in turn, slide in fixed guide rails 572, 574 respectively. Rails 572, 574 are secured to and supported by a tote tray carriage generally designated 576. Carriage 576 includes a pair of spaced end plates 578, 580 that are held in spaced, parallel planes by a pair of channel-shaped frame members 582. Rail 572 is secured to mounting flanges 584 at the top of the plates 578, 580 and, similarly, rail 574 is secured to mounting flanges 586. Thus the tray 560 is secured to the end plates for movement with the carriage 576.

Four guide rollers 588 are secured to the end plates 578, 580. One of the rollers is secured to the upper portion of plate 578 near the edge thereof opposite from the mounting flange 586. Another of the rollers is secured to the lower portion of the end plate 578 and also adjacent to the edge opposite from flange 586. Two of the rollers 588 are secured to plate 580 in a similar manner. The rollers are on the outside surface of the plates 578, 580. End plates 578, 580 project through wide vertical slots 590 in frame plate 514 as shown in FIG. 18. The edge portions of the mounting plates containing rollers 588, and the frame members 582, are located outside of the plate 514 while the mounting flanges 584, 586 are located inside the plate 514 and beneath the assembly tray. The rollers 588 on end plate 578 fit within and ride along a channel-shaped track 592 secured to the outside surface of plate 514. Similarly, the rollers 588 on plate 580 ride in a channel-shaped track 594 secured to plate 514. As illustrated in FIG. 19, the carriage has a bar 596 that is secured to the portions of end plates 578, 580 opposite from the frame members 582. Bar 596 carries a roller 598 which rides in a channel-shaped track 600 supported by the frame of the binder. Thus the rollers 588, 598 guide the carriage 576 for vertical movement within the binder. This allows the binder tote tray to be initially in an elevated position immediately beneath the assembly tray and then to be slowly moved downwardly therefrom as booklets accumulate in the tote tray.

Carriage 576 and the tote tray 560 carried by it are moved upwardly and downwardly beneath the assembly tray by a chain drive mechanism generally designated 602 and best illustrated in FIGS. 18 and 19. The drive mechanism comprises a reversible motor 604 that sits on the bottom of the frame of the binder in the area beneath tote tray 560. A sprocket 606 is attached to the motor drive shaft. Sprockets 610 and 614 are mounted on an idler shaft 612 located on the outer surface of plate 514. A chain 608 is trained around sprocket 606 and sprocket 610 so that the motor can rotate shaft 612 and sprocket 614. An idler sprocket 616 is mounted on plate 514 between the pair of pneumatic cylinders 544. An endless chain 618 is trained around sprockets 614, 616. One reach of the chain 618 is secured by a pin 620 to a frame member 622. The frame member 622, in turn, extends between and is attached to the pair of frame members 582 of the carriage frame. Thus when motor 604 is driven, the sprocket 606 on the motor drive shaft drives chain 608 to thereby rotate sprockets 610, 614 on shaft 612. Rotation of sprocket 614 in turn moves the chain 618 and pin 620 upwardly or downwardly and thereby moves the carriage 576 and the tray 560 supported by it in a vertical direction. Limit switches (not shown) can be provided for limiting the upward and downward movement of the carriage 576 and tote tray 560.

OPERATION

Operation of the apparatus will now be described. By using the operator control panel 26, the machine operator programs the apparatus for the desired mode of operation. For example, the machine operator can program the copier/duplicator 20 to produce either simplex copy sheets or duplex copy sheets. In addition, the operator can indicate by panel 26 that the sheets of the original document to be copied are either simplex document sheets or duplex document sheets. Through the control panel, the machine can be prepared to copy document sheets fed to the platen by the recirculating document feeder 22, by the document positioner 24, or by lifting the recirculating feeder 22 and manually placing document sheets directly on the platen. A typical job, as described herein, utilizes the recirculating feeder operating in a collating mode of operation. Also, the operator can program the machine to deliver the output of the copier/duplicator 20 directly to output tray 28 without finishing, to the finisher 42 of the finisher/-binder for stapling of sets of copies together, or to the binder 44 of the stapler binder where adjacent sheets of a set are secured together by an adhesive. As a further alternative the sheets can be delivered along path 34 and out of slot 90 of the binder. Depending on the operator input to the control panel 26, diverters 30, 60, frame 92 and carriage 94 are moved to the correct position to control movement of the copy sheets along paths 32, 34. Operation of a duplicator and a stapler finisher as shown at 42 is described in U.S. Pat. No. 4,134,672, incorporated by reference hereinbefore, and need not be repeated in detail here. In the following description it will be assumed that diverters 30 and 60 are positioned in their solid line position as shown in FIG. 2 to thereby direct copy sheets seriatim along path 34 into the binder 44, and that the frame 92 and carriage 94 are located in the dotted line position so that sheets entering the binder are deflected into the alignment tray 108 instead of being transported completely through the binder and out slot 90 along path 34. When the operator programs the machine to form booklets in the binder, the LCU 112 causes the adhesive applicator to move from its storage position (FIG. 7) to its operating position (FIG. 9) so that the applicator can apply adhesive to sheets driven past the applicator.

A bound booklet is formed by the binder 44 from a set of copy sheets fed seriatim from the copier/duplicator 20 along sheet path 34. The set of sheets may have a particular order or sequence. For example, when the recirculating feeder 22 is operating in its "collating mode", the set of copy sheets are bound in the same order as the set of document sheets in the feeder with the first copy sheet of a set delivered to the binder being a copy of the last sheet of the document set and with the last copy sheet of a set delivered to the binder being a copy of the first sheet of the document set. Cover sheets can be provided for the front and/or back of the booklet from one of the two copy sheet supplies of the duplicator. A back cover sheet will preceed other sheets of the set along path 34, and a front cover sheet will follow other sheets of the set along path 34. While the binding of sheets together in a particular order is described in detail, it will be understood that, in other instances, the set of sheets to be bound together will not have a particular page sequence or order. Thus the copy sheets of a bound set can comprise multiple copies of a single document sheet copied by operation of the recirculating feed 22 in its "non-collate" mode, or by operation of the document positioner 24, or by manually placing a document sheet on the copier platen.

The LCUs 110 and 112 receive signals from, and provide control signals to, the recirculating feeder 22, copier/duplicator 20 and stapler/binder 40 so that operation of the various portions of the apparatus are sensed and controlled in a coordinated manner. For example, the LCUs will receive from control panel 26 the number of sets of copies to be produced and, from panel 26 or by counting in the feeder 22, the number of sheets in the original document. Sensors in the apparatus will provide signals to the LCUs so they can track copy sheets (and any cover sheets) through the apparatus. This precise sensing and control of the apparatus permits the adhesive applicator to be cycled on and off as required to apply adhesive to all sheets except the first sheet of a set, permits the pressure bar assembly to be cycled to apply pressure to a partially completed booklet after each few sheets are fed to the assembly tray and then to apply pressure for a longer period of time after the last sheet is furnished to the tray, etc. As copy sheets enter the binder they are travelling in a left-to-right direction as shown by arrow A1 in FIG. 3 and as viewed from the front of the machine. The sheets then drop downwardly onto the alignment tray 108. During movement in direction A1 the trailing edge of the sheet is the side edge that is to be bound to other sheets. As illustrated in FIG. 3, the sheets are delivered to the tray so that the top of the sheet is near the front of the machine and with the copied information on simplex copy sheets being on the bottom face of the sheet and thus facing downwardly. When duplex copy sheets are delivered to the binder, the information on the bottom face of the sheet comprises the odd page number of the sheet or the page that is normally first in reading the document.

Immediately after the trailing edge of the sheet enters tray 108 it is engaged by the side jogger 126 and urged to the right against the side guide 120. When the LCU 112 receive a signal indicating a sheet has been delivered to tray 108 the LCU 112 opens a valve to provide fluid through conduit 180 to cylinder 172. The cylinder swings the puck drive mechanism 144 from the storage position illustrated in FIGS. 4 and 5, to the operating position illustrated in FIG. 6. This moves puck drive roller 168 and the rest of mechanism 144 from an elevated position, where it is out of the way of the sheet entering the binder, to the drive position where drive roller 168 engages the upper surface of the sheet in tray 108. The drive roller is driven in a counterclockwise direction, as viewed in FIGS. 5 and 6, and thus immediately drives the sheet toward the rear of the machine and into the nip between the pairs of drive rollers 132 and idler rollers 134. Promptly after the sheet enters the nip between the rollers 132, 134, the LCU 112 returns puck drive mechanism 144 to its raised position (shown in FIGS. 4 and 5) so that the next sheet can be delivered to the tray 108.

Puck drive mechanism 144 and the rollers 132, 134 drive the left side edge of the sheet past the adhesive applicator 200. The direction of movement of the sheet at this time, as illustrated by arrow A2 in FIG. 3, is perpendicular to the direction of movement indicated by arrow A1. The first sheet of a booklet set delivered to tray 108 (which ordinarily is the last sheet or back cover of the set) does not receive any adhesive as it passes the applicator 200. Immediately after the first sheet passes the applicator, and just before the second sheet of a set reach the applicator, the logic and control unit 112 of the finisher/binder opens valve 210 and adhesive begins flowing through the tip end 206 of the nozzle of the applicator in a constant stream. The flow of adhesive continues without interruption until the second sheet completely passes the applicator, thereby applying a continuous line of adhesive to the upper surface of the sheet from the bottom edge to the top edge of the sheet. The LCU 112 closes valve 210 immediately after the trailing edge of the second sheet passes the applicator. This on-off operation of the applicator is repeated until a stripe of adhesive is applied to all sheets of a set of copy sheets after the first sheet of the set. If a second (top) cover sheet is provided, adhesive also is applied to that sheet. By way of example, the flow of adhesive can be initiated about twenty milliseconds before a sheet reaches the applicator nozzle and terminated about twenty milliseconds after a sheet passes the nozzle. This control of the flow of adhesive to all but the first sheet will be repeated for all subsequent sets of copy sheets delivered to the binder. This control is possible because the LCUs 110, 112 control and monitor both the production of sets of copy sheets and the operation of the binder.

Sheets driven from tray 108 and past applicator 200 then travel along the sheet guide 380 and between rollers 382 and 384. This inverts the sheet and delivers it to the assembly tray 392 in a direction, illustrated by arrow A3 in FIG. 3, which is opposite to the direction A2 of the sheets leaving tray 108. Sheets enter the tray 392 with information copied onto simplex copy sheets facing upwardly and with the top of the sheet at the rear of the tray. The left side edges of guides 380 and 394 are offset to the right from the left side edge of the copy sheets which receive adhesive so that the copy sheets travel around guide 380 and beneath guide 394 without disturbing the small line of adhesive applied to the sheets by the applicator.

A copy is fed to the assembly tray 392 at a level above the tray surfaces 404, 424 and beneath the rods 406, 426. The sheet travels above surfaces 404, 424 (and any other sheets of the set previously delivered to the tray) until (or approximately until) the leading edge of the sheet engages sheet registration member 492. Then the sheet settles into the tray on top of surfaces 404, 424 or other sheets in the tray. Thus the adhesive on one sheet does not significantly contact or wipe against a lower sheet until the sheet is substantially in position over the lower sheet. As each sheet enters the tray, its rear edge is engaged by the jogger 396 which urges the leading edge of the sheet firmly against sheet registration member 492. Also, the side jogger 504 engages the side edge of each sheet and urges it against the surface 508 of registration member 506.

Pressure bar assembly 520 is normally in its raised position, as illustrated in FIG. 4 of the drawings, where it is out of the path of sheets entering tray 392. After each group of a few sheets (e.g. 2–4 sheets) is delivered to the assembly tray 392, cylinders 544 are energized to bring the pressure bar 534 downwardly into engagement with the sheets in the assembly tray. The bar engages the upper surface of the top sheet along a line directly overlying the adhesive on the lower surface of the sheet. Pressure bar assembly 520 thus periodically and repeatedly compresses the sheets stacked in the assembly tray in the area of the adhesive to effect a firm bond between adjacent sheets. The pressure bar assembly 520 also presses downwardly on the uppermost sheet after the last sheet of a set is delivered to the assembly tray. This last sheet of the set normally is the first sheet or cover sheet of a copy set. The application of pressure can be for a longer period of time after the last sheet of a set is in the tray. The periodic application of pressure after each few sheets are delivered to the tray 392 is especially beneficial in the production of booklets comprising many copy sheets.

When a complete set of copy sheets has been assembled and bound together into a booklet in the tray 392, cylinder 446 of the tray moving mechanism 444 (FIGS. 15 and 16) is energized to swing the tray portions 400, 402 from their generally horizontal positions shown in FIG. 15 to their generally vertical positions shown in FIG. 16. This opens the bottom of the tray and allows the completed booklet to drop through the assembly tray and onto the tote tray 560 located beneath the assembly tray. Such movement of the booklet is illustrated by arrow A4 in FIG. 3. As the tray portions 400, 402 are swung to the FIG. 16 position, the rods 406, 426 can engage and push downwardly on the completed booklet to quickly remove it from the tray. This allows the tray portions to be returned quickly from their FIG. 16 position back to the FIG. 15 position so that they are prepared to receive the first sheet of the next set of sheets to be assembled in the tray 392.

Modern copier duplicators produce copies at relatively high rates, e.g., 4,000–8,000 copies per hour. Therefore, in some instances it is desirable to provide a slight time delay between the time the last sheet of one booklet and the first sheet of the next booklet is furnished to the assembly tray. Such a time delay will permit cycling of the pressure bar 536 and moving the assembly tray from the FIG. 15 position to the FIG. 16 position for removal of a booklet and back to the FIG. 15 position. One way this time delay can be accomplished is for the LCU to briefly stop copying of document sheets by the copier/duplicator between each set. A time delay equivalent to the time required for producing one copy sheet is sufficient for this purpose. Another way this time delay can be accommplished is to retard feeding of copy sheets at some point along the copy sheet path between the copier/duplicator and the assembly tray.

Initially the tote tray 560 is positioned immediately beneath the assembly tray 392 as shown in FIG. 4. The position of the tote tray is under control of the logic and control unit 112 for the binder. The LCU operates motor 604 to raise or lower the carriage 576, and thus the tray, to the desired position relative to the assembly tray. As one booklet after another is deposited in the tote tray 560, the motor 604 slowly lowers the carriage 576 and the tote tray 560 so that the uppermost booklet on the tote tray at any particular time is immediately beneath the assembly tray 392. Periodically, such as at the end of a job, the machine operator removes the tote tray 560 to thereby remove the completed sets from the binder. Another tote tray is then inserted in position in the binder and the operation can be continued. Alternatively, the tote tray can simply be extended forwardly and the booklets on the tray removed manually.

When a booklet is discharged from the assembly tray at least some of the adhesive between sheets of the booklet will still be wet. However, the wet strength of the booklet permits immediate inspection and handling of the booklet. Ambient air drying of the adhesive further increases the bond between sheets of the booklet and results in a very durable booklet. If desired, heat can be applied for drying and/or curing the adhesive. For example,. heat can be applied by heating the pressure bar 536.

While the binder and its operation have been described in connection with a copier/duplicator, it will be understood that the binder can be operated with other apparatus adapted to feed a stream of sheets, etc. seriatim to the binder for securing of the sheets together. Also, while the binder has been discribed in connection with a stapler finisher 42, it will be understood that the binder can be a "stand alone" unit (separate from a stapler finisher), or it can be secured directly to another piece of apparatus, such as the copier/duplicator 20. Also, operation of the apparatus has been described primarily in connection with the production of sets of sheets wherein successive sheets of a set are different as occurs when a set of document sheets are placed in the recirculating feeder for copying seriatim. However, it will be understood that a set of sheets in a booklet may comprise multiple copies of a single page sheet. This procedure can produce booklets of forms (for example) with each adjacent sheet in the booklet being identical. Even blank sheets can be bound together to form booklets by using the apparatus of this invention.

The invention has been described in detail with particular reference to a preferred embodiment thereof, but it will be understood that variations and modifications can be effected within the spirit and scope of the invention.

We claim:

1. A method for producing collated sets of copy sheets from a set of document sheets and for adhesively binding each set of copy sheets into a booklet, the method comprising the steps of:

circulating a set of document sheets arranged in page sequential order seriatim a plurality of times to a document imaging station;

copying each document sheet once each time it is circulated to the imaging station, thereby producing a stream of copy sheets to form sets having a page sequence corresponding to the set of document sheets;

advancing the stream of copy sheets initially in a first direction with the trailing edge of each copy sheet comprising the edge that is to be bound to other sheets and then advancing the stream of sheets in a second direction with the sheet edge to be bound to other sheets being located along one side edge thereof;

applying a stripe of liquid adhesive to copy sheets and stacking each set of copy sheets in the same order as the set of document sheets with adhesive being applied so that there is adhesive between adjacent copy sheets in a set of copy sheets, the adhesive being applied to such one side edge of the copy sheets while the sheets are advanced in the second direction; and applying pressure to each set of stacked copy sheets in the area where adhesive is located between the sheets, thereby to form bound booklets of copy sheets corresponding in order to the order of sheets in the document set.

2. The invention as set forth in claim 1 wherein adhesive is applied to the upper surface of the copy sheets, and further comprising inverting the copy sheets after adhesive is applied and before the sheets are stacked.

3. The invention as set forth in claim 1 wherein the step of applying adhesive to copy sheets comprises driving each set of copy sheets seriatim and spaced in the stream past an adhesive applicator, and feeding adhesive from the applicator while all sheets of a set except one sheet are driven past the applicator, thereby to apply adhesive to all sheets of a set except such one sheet.

4. The invention as set forth in claim 3 wherein adhesive is applied to the upper surface of the copy sheets, the one copy sheet comprises the first copy sheet driven past the applicator, and further comprising the step of inverting the copy sheets after the sheets are driven past the applicator and before the sheets are stacked.

5. The invention as set forth in claim 3 wherein the adhesive is liquid and is dispensed from the applicator under pressure and in a plurality of continuous streams beginning before a sheet reaches the applicator and continuing until after the sheet passes the applicator, thereby to apply a continuous stripe of adhesive to sheets and cause adhesive to be dispensed between sheets, and further comprising the step of collecting the adhesive dispensed between sheets.

6. The invention as set forth in claim 1 wherein the step of applying pressure is repeated after each few sheets are stacked and after the last sheet of a set is stacked, and pressure is applied for a longer period of time after the last sheet of a set is stacked than any previous application of pressure to the set.

7. A method for binding a set of sheets together adjacent to one edge of the sheet to form a bound booklet; the method comprising the steps of:

feeding sheets seriatim in a first direction into an input station;

aligning each sheet in the input station;

advancing the sheets seriatim in a second direction along a sheet path leading from the input station to an assembly station where the booklet is formed, the second direction being substantially perpendicular to the first direction;

inverting each sheet before the sheet reaches the assembly station;

applying a continuous stripe of liquid adhesive to the second sheet and each subsequent sheet of the set as the sheets are advanced along the sheet path in the second direction and before the sheets are inverted, the adhesive being applied to the upper surface of each sheet adjacent and parallel to the edge of the sheet that is the trailing edge as the sheet moves in the first direction;

aligning the sheets of the set in a stack in the assembly station with the first sheet advanced along the path being at the bottom of the stack and with subsequent sheets advanced along the path being above the first sheet and in the same order as the sheets were advanced along the path; and applying pressure to sheets in the assembly station above the stripe of adhesive on the sheets to facilitate binding of the sheets together, thereby to form a bound booklet.

8. The invention as set forth in claim 7 wherein the step of applying pressure to the stack of sheets above the adhesive is repeated at least twice, including one time before all sheets of the set are advanced to the assembly station and one time after all sheets of the set are advanced to the assembly station and aligned in the stack.

9. The invention as set forth in claim 7 wherein the step of applying adhesive comprises initiating and terminating the flow of adhesive once each time a sheet except the first sheet of the set is advanced along the sheet path, and continuing the flow of adhesive for a time sufficient to apply a continuous strip of adhesive to a sheet.

10. The invention as set forth in claim 7 further comprising the step of monitoring the flow of adhesive, and stopping the formation of a booklet in the event adhesive does not flow continuously to apply adhesive to the second sheet through the last sheet of the set.

11. A method for binding together a plurality of sheets, the method comprising the steps of:

moving a plurality of sheets seriatim along a path and past a nozzle;

applying a stripe of liquid adhesive to a sheet as it moves past the nozzle, the adhesive applying step comprising initiating the flow of adhesive from the nozzle and then driving a sheet past the nozzle so that a continuous strip of adhesive is applied along the sheet from one edge of the sheet to another edge of the sheet and in a direction parallel to the direction of travel to the sheet; and stacking a plurality of sheets having adhesive thereon so that the adhesive is between adjacent sheets.

12. The invention as set forth in claim 11 wherein the step of moving the sheets along the path comprises advancing the sheets seriatim and in spaced relation, wherein the step of applying adhesive further comprises initiating the flow of adhesive before the leading edge of a sheet is driven past the nozzle and terminating the flow of adhesive after the trailing edge of a sheet is driven past the nozzle, and wherein the step of applying adhesive is repeated for each of the sheets except for one sheet.

13. The invention as set forth in claim 11 further comprising the step of pressing stacked sheets together in the area containing adhesive.

14. The invention as set forth in claim 11 further comprising pressing stacked sheets together in the area containing adhesive after less than all of the sheets are stacked and again after the last sheet is stacked.

15. The invention as set forth in claim 11 further comprising inverting the sheets prior to stacking the sheets, and wherein adhesive is applied before the sheets are inverted to the one surface of the second sheet and all subsequent sheets.

16. The invention as set forth in claim 15 further comprising monitoring the flow of adhesive from the nozzle, and stopping the movement of sheets in the event adhesive is not flowing from the nozzle at any time during movement past the nozzle of the second sheet through the last sheet.

17. The invention as set forth in claim 11 further comprising removing the nozzle from a reservoir of adhesive solvent and moving the nozzle to a position adjacent the sheet path before the second sheet is moved along the path, and returning the nozzle to the reservoir after the last sheet is moved along the path.

* * * * *